United States Patent
Borgendale et al.

(10) Patent No.: US 8,122,144 B2
(45) Date of Patent: Feb. 21, 2012

(54) RELIABLE MESSAGING USING REDUNDANT MESSAGE STREAMS IN A HIGH SPEED, LOW LATENCY DATA COMMUNICATIONS ENVIRONMENT

(75) Inventors: Kenneth W. Borgendale, Austin, TX (US); Eliezer Dekel, Haifa (IL); John J. Duigenan, New York, NY (US); Gidon Gershinsky, Haifa (IL); Alexander Krits, Haifa (IL); Nir Naaman, Haifa (IL); Foluso O. Okunseinde, Austin, TX (US); Hilary A. Pike, College Station, TX (US); Cornell G. Wright, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1154 days.

(21) Appl. No.: 11/426,849

(22) Filed: Jun. 27, 2006

(65) Prior Publication Data

US 2007/0299973 A1     Dec. 27, 2007

(51) Int. Cl.
  *G06F 15/16*     (2006.01)
  *H04L 12/26*     (2006.01)

(52) U.S. Cl. ........ 709/232; 709/223; 709/227; 709/231; 370/216

(58) Field of Classification Search .................. 709/227, 709/217–219, 228, 229; 719/313–317; 714/1–15
  See application file for complete search history.

(56) References Cited

U.S. PATENT DOCUMENTS

| | | |
|---|---|---|
| 4,787,035 A | 11/1988 | Bourne |
| 4,947,429 A | 8/1990 | Bestler et al. |
| 5,195,092 A | 3/1993 | Wilson et al. |
| 5,732,274 A | 3/1998 | O'Neill |
| 5,809,028 A | 9/1998 | Nethercott et al. |
| 5,809,337 A | 9/1998 | Hannah et al. |
| 5,940,843 A | 8/1999 | Zucknovich et al. |
| 5,987,432 A | 11/1999 | Zusman et al. |
| 6,125,391 A | 9/2000 | Meltzer et al. |

(Continued)

FOREIGN PATENT DOCUMENTS

EP     1 039 410 A     9/2000

(Continued)

OTHER PUBLICATIONS

Office Action Dated Oct. 30, 2008 in U.S. Appl. No. 11/780,826.
Office Action Dated Mar. 19, 2009 in U.S. Appl. No. 11/559,425.
Office Action Dated May 6, 2009 in U.S. Appl. No. 11/559,434.
Office Action Dated May 8, 2009 in U.S. Appl. No. 11/586,076.
Office Action Dated Mar. 6, 2009 in U.S. Appl. No. 11/426,764.
Office Action Dated Feb. 6, 2009 in U.S. Appl. No. 11/567,898.

(Continued)

*Primary Examiner* — Ian N Moore
*Assistant Examiner* — Thai Nguyen
(74) *Attorney, Agent, or Firm* — DeLizio Gilliam, PLLC

(57) ABSTRACT

Methods, apparatus, and products are disclosed for reliable messaging using redundant message streams in a high speed, low latency data communications environment that include brokering, by a stream administration server, establishment of an active message stream to a subscribing client device from an active feed adapter, the active message stream capable of communicating active application messages; brokering, by the server, establishment of a backup message stream to the subscribing client device from a backup feed adapter, the backup message stream capable of communicating backup application messages representing duplicates of the active messages; receiving the active messages in messaging middleware of the subscribing client device; receiving, in response to a failover, the backup messages in the messaging middleware; and administering, by the messaging middleware, the backup messages in dependence upon an active stream source identifier, an active stream source sequence number, a backup stream source identifier, and a backup stream source sequence number.

14 Claims, 7 Drawing Sheets

U.S. PATENT DOCUMENTS

| | | | |
|---|---|---|---|
| 6,141,324 A | 10/2000 | Abbott et al. | |
| 6,160,874 A | 12/2000 | Dickerman et al. | |
| 6,343,321 B2* | 1/2002 | Patki et al. | 709/227 |
| 6,694,316 B1 | 2/2004 | Langseth et al. | |
| 6,725,446 B1 | 4/2004 | Hahn et al. | |
| 6,757,710 B2 | 6/2004 | Reed | |
| 6,901,428 B1 | 5/2005 | Frazier et al. | |
| 6,910,078 B1* | 6/2005 | Raman et al. | 709/231 |
| 6,954,454 B1 | 10/2005 | Schuster et al. | |
| 7,113,520 B1 | 9/2006 | Meenan | |
| 7,120,165 B2 | 10/2006 | Kasvand-Harris et al. | |
| 7,225,195 B2 | 5/2007 | Avrahami et al. | |
| 7,283,904 B2 | 10/2007 | Benjamin et al. | |
| 7,415,715 B2 | 8/2008 | Fradkov et al. | |
| 7,448,043 B2 | 11/2008 | Shenfield et al. | |
| 2001/0016783 A1 | 8/2001 | Graumann et al. | |
| 2001/0049743 A1 | 12/2001 | Phippen et al. | |
| 2002/0019812 A1 | 2/2002 | Board et al. | |
| 2002/0022952 A1 | 2/2002 | Zager et al. | |
| 2002/0023040 A1 | 2/2002 | Gilman et al. | |
| 2002/0083097 A1 | 6/2002 | Warrington | |
| 2002/0086688 A1 | 7/2002 | Kang | |
| 2002/0161900 A1* | 10/2002 | Brown et al. | 709/227 |
| 2002/0169706 A1 | 11/2002 | Chandra et al. | |
| 2002/0172155 A1 | 11/2002 | Kasvand-Harris et al. | |
| 2003/0073406 A1 | 4/2003 | Benjamin et al. | |
| 2003/0115291 A1 | 6/2003 | Kendall et al. | |
| 2003/0115548 A1 | 6/2003 | Melgar | |
| 2003/0158805 A1 | 8/2003 | Mozhdehi | |
| 2003/0204719 A1 | 10/2003 | Ben-Itzhak | |
| 2004/0024753 A1 | 2/2004 | Chane et al. | |
| 2004/0024845 A1 | 2/2004 | Fishhaut et al. | |
| 2004/0034591 A1 | 2/2004 | Waelbroeck et al. | |
| 2004/0054744 A1 | 3/2004 | Karamchedu et al. | |
| 2004/0148357 A1 | 7/2004 | Corrigan et al. | |
| 2004/0190459 A1* | 9/2004 | Ueda et al. | 370/252 |
| 2004/0193703 A1 | 9/2004 | Loewy et al. | |
| 2004/0199524 A1 | 10/2004 | Rys et al. | |
| 2004/0205439 A1 | 10/2004 | Carmeli et al. | |
| 2004/0216135 A1 | 10/2004 | Heimbeck | |
| 2005/0010311 A1 | 1/2005 | Barbazette et al. | |
| 2005/0028195 A1 | 2/2005 | Feinleib et al. | |
| 2005/0028208 A1 | 2/2005 | Ellis et al. | |
| 2005/0044197 A1 | 2/2005 | Lai | |
| 2005/0102218 A1 | 5/2005 | Sargent et al. | |
| 2005/0105533 A1 | 5/2005 | Malolepsy et al. | |
| 2005/0149543 A1 | 7/2005 | Cohen et al. | |
| 2005/0195820 A1 | 9/2005 | Betts et al. | |
| 2005/0222931 A1 | 10/2005 | Mamou et al. | |
| 2005/0246186 A1 | 11/2005 | Nikolov | |
| 2005/0246423 A1 | 11/2005 | Starbuck et al. | |
| 2005/0254508 A1 | 11/2005 | Aksu et al. | |
| 2005/0261923 A1 | 11/2005 | Brown et al. | |
| 2005/0262025 A1 | 11/2005 | Wajih et al. | |
| 2005/0273408 A1 | 12/2005 | Bandman et al. | |
| 2006/0085507 A1 | 4/2006 | Zhao et al. | |
| 2006/0143307 A1 | 6/2006 | Codignotto | |
| 2006/0149840 A1 | 7/2006 | Thompson et al. | |
| 2006/0206440 A1 | 9/2006 | Anderson et al. | |
| 2006/0242240 A1 | 10/2006 | Parker et al. | |
| 2006/0269148 A1 | 11/2006 | Farber et al. | |
| 2007/0038543 A1 | 2/2007 | Weinstein | |
| 2007/0038712 A1 | 2/2007 | Affronti et al. | |
| 2007/0073907 A1 | 3/2007 | Factor et al. | |
| 2007/0091789 A1* | 4/2007 | Thukral | 370/216 |
| 2007/0106813 A1 | 5/2007 | Bordes et al. | |
| 2007/0150918 A1 | 6/2007 | Carpenter et al. | |
| 2007/0233728 A1 | 10/2007 | Puteick et al. | |
| 2007/0271447 A1 | 11/2007 | Agarwala et al. | |
| 2007/0299936 A1 | 12/2007 | Borgendale et al. | |
| 2007/0299973 A1 | 12/2007 | Borgendale et al. | |
| 2007/0300233 A1 | 12/2007 | Bhogal et al. | |
| 2007/0300234 A1 | 12/2007 | Dekel et al. | |
| 2007/0300235 A1 | 12/2007 | Dekel et al. | |
| 2008/0010487 A1 | 1/2008 | Dekel et al. | |
| 2008/0069141 A1 | 3/2008 | Bonaguro et al. | |
| 2008/0103949 A1 | 5/2008 | Lobana et al. | |
| 2008/0104266 A1 | 5/2008 | Dekel et al. | |
| 2008/0114839 A1 | 5/2008 | Borgendale et al. | |
| 2008/0114938 A1 | 5/2008 | Borgendale et al. | |
| 2008/0137830 A1 | 6/2008 | Bhogal et al. | |
| 2008/0140550 A1 | 6/2008 | Berezuk et al. | |
| 2008/0141272 A1 | 6/2008 | Borgendale et al. | |
| 2008/0141273 A1 | 6/2008 | Borgendale et al. | |
| 2008/0141275 A1 | 6/2008 | Borgendale et al. | |
| 2008/0141276 A1 | 6/2008 | Borgendale et al. | |
| 2008/0243675 A1 | 10/2008 | Parsons et al. | |
| 2008/0244017 A1 | 10/2008 | Gershinsky et al. | |
| 2009/0006559 A1 | 1/2009 | Bhogal et al. | |
| 2009/0006560 A1 | 1/2009 | Bhogal et al. | |

FOREIGN PATENT DOCUMENTS

| | | |
|---|---|---|
| EP | 2007/055851 | 6/2007 |
| JP | 2004274703 A | 9/2004 |
| JP | 2007209040 A | 8/2007 |
| JP | 2005542141 T | 11/2009 |
| WO | WO9900753 A1 | 1/1999 |
| WO | WO 2005/045670 A | 5/2005 |
| WO | PCT/EP2007/055851 | 6/2007 |

OTHER PUBLICATIONS

Office Action Dated Apr. 6, 2009 in U.S. Appl. No. 11/608,904.
Office Action Dated Apr. 14, 2009 in U.S. Appl. No. 11/780,826.
U.S. Appl. No. 11/780,826, filed Jul. 20, 2007, Berezuk, et al.
"PCQuote.com Releases PCQuote Oribit", PR Newswire, New York: Nov. 2, 1999. p. 1.
"FirstQuote Provides Financial Information Services for Brokat E-Finance Application", PR newswire, New York: Feb. 21, 2000.
Speakman, et al.; RFC 3208—PGM Reliable Transport Protocol Specification; www.faqs.org; 2001; pp. 1-72; RFC 3208; Network Working Group.
PCT Search Report and Written Opinion, Jun. 5, 2008; PCT Application No. PCT/EP2007/063194.
PCT Search Report and Written Opinion, Feb. 4, 2008; PCT Application No. PCT/EP2007/063239.
PCT Search Report and Written Opinion, Jul. 7, 2008; PCT Application No. PCT/EP2008/053370.
PCT Search Report and Written Opinion, Sep. 14, 2007; PCT Application No. PCT/EP2007/055851.
Office Action Dated May 27, 2009 in U.S. Appl. No. 11/426,857.
Office Action Dated Jun. 1, 2009 in U.S. Appl. No. 11/769,240.
Office Action Dated Feb. 24, 2009 in U.S. Appl. No. 11/609,696.
Office Action Dated May 20, 2009 in U.S. Appl. No. 11/426,819.
Office Action Dated Jun. 2, 2009 in U.S. Appl. No. 11/426,864.
Office Action Dated Jun. 22, 2009 in U.S. Appl. No. 11/769,243.
Office Action Dated Jun. 25, 2009 in U.S. Appl. No. 11/426,849.
Neville, Jennifer et al. "Using relational knowledge discovery to prevent securities fraud." Proceedings of the eleventh ACM SIGKDD international conference on Knowledge discovery in data mining. Aug. 2005. ACM Press. 449-458.
Office Action Dated Dec. 10, 2009 in U.S. Appl. No. 11/426,849.
Office Action Dated Aug. 18, 2009 in U.S. Appl. No. 11/609,566.
Office Action Dated Jan. 22, 2010 in U.S. Appl. No. 11/609,604.
Final Office Action Dated Aug. 14, 2009 in U.S. Appl. No. 11/567,898.
Office Action Dated Aug. 28, 2009 in U.S. Appl. No. 11/426,789.
Final Office Action Dated Dec. 2, 2009 in U.S. Appl. No. 11/426,864.
Final Office Action Dated Apr. 17, 2009 in U.S. Appl. No. 11/780,826.
Final Office Action, U.S. Appl. No. 11/609,604, Apr. 19, 2010.
Office Action, U.S. Appl. No. 11/609,708, Apr. 19, 2010.
Final Office Action, U.S. Appl. No. 11/609,708, Sep. 8, 2010.
Office Action, U.S. Appl. No. 11/426,789, Oct. 6, 2010.
Office Action, U.S. Appl. No. 11/567,357, May 27, 2010.
Final Office Action, U.S. Appl. No. 11/567,357, Oct. 27, 2010.
Final Office Action, U.S. Appl. No. 11/426,849, Aug. 17, 2010.
Office Action, U.S. Appl. No. 11/728,850, Jul. 27, 2010.
Notice of Allowance, U.S. Appl. No. 11/728,850, Nov. 22, 2010.

* cited by examiner

RELIABLE MESSAGING USING REDUNDANT MESSAGE STREAMS IN A HIGH SPEED, LOW LATENCY DATA COMMUNICATIONS ENVIRONMENT

BACKGROUND OF THE INVENTION

1. Field of the Invention

The field of the invention is data processing, or, more specifically, methods, apparatus, and products for reliable messaging using redundant message streams in a high speed, low latency data communications environment.

2. Description of Related Art

Messaging environments are generally available to provide data communication between message sending devices and message receiving devices using application messages. An application message is a quantity of data that includes one or more data fields and is passed from a message producer installed on a message sending device to a message consumer installed on a message receiving device. An application message is a form of message recognized by application software operating in the application layer of a data communication protocol stack—as contrasted for example with a transport message or network message, which are forms of messages recognized in the transport layer and the network layer respectively. An application message may represent, for example, numeric or textual information, images, encrypted information, and computer program instructions.

A messaging environment may support point-to-point messaging, publish and subscribe messaging, or both. In a point-to-point messaging environment, a message producer may address an application message to a single message consumer. In a publish and subscribe messaging environment, a message producer may publish an application message to a particular channel or topic and any message consumer that subscribes to that channel or topic receives the message. Because message producers and message consumers communicate indirectly with each other via a channel or topic in a publish and subscribe environment, message transmission is decoupled from message reception. As a consequence, neither producers nor consumers need to maintain state about each other, and dependencies between the interacting participants are reduced or eliminated. A publish and subscribe environment may, therefore, allow message publishers and message subscribers to operate asynchronously.

For further explanation of a messaging environment, FIG. 1 sets forth a block diagram illustrating a typical messaging environment for data communications that includes a message sending device (100), a message receiving device (104), and a message administration server (102). The message sending device (100) is a computer device having installed upon it a message producer (110), a set of computer program instructions configured for transmitting application messages to the message administration server (102) for delivery to a message receiving device. In the example of FIG. 1, the message producer (110) transmits application messages to the message administration server (102) on a message stream (106). The message sending device (100) may produce the transmitted messages by generating the application messages from data of the message sending device itself or data received from some other source. The message receiving device (104) is a computer device having installed upon it a message consumer (112), a set of computer program instructions configured for receiving application messages from the message administration server (102). In the example of FIG. 1, the message consumer (112) receives the application messages from the message administration server (102) on a message stream (108). In the example of FIG. 1, the message stream (106) and the message stream (108) are data communication channels implemented using, for example, the User Datagram Protocol ('UDP') and the Internet Protocol ('IP').

In either a point-to-point messaging environment or a publish and subscribe messaging environment, the application messages transmitted from message sending devices to message receiving devices typically pass through the message administration server (102). The message administration server (102) is computer device having installed upon it a message administration module (114), computer program instructions configured for administering the messages transmitted from the message producer (110) to the message consumer (112). Examples of message administration modules may include the IBM WebSphere® MQ, the Open Message Queue from Sun Microsystems, and the OpenJMS from The OpenJMS Group. In a point-to-point messaging environment, the message administration module (114) provides message queuing for the message consumer (112) as the message administration module (114) receives application messages addressed to the consumer (112) from various message providers. In a publish and subscribe messaging environment, the message administration module (114) administers the various channels or topics to which message producers publish and message consumers subscribe. In either message environment, the message administration module (114) may also provide security services to ensure that the only messages arriving at the messaging consumer (112) from the message producer (110) are those messages that the message consumer (112) is authorized to receive and that the message producer (110) is authorized to send. Moreover, the message administration module (114) may also coordinate providing to the message consumer backup messages from a backup message producer in the event that a failure occurs on the message producer (110).

Current messaging environments such as, for example, the one described above with reference to FIG. 1, have certain drawbacks. Application messages transmitted to a message administration server from a message sending device for delivery to a message receiving device are delayed in the message administration server until the message administration server can process the messages. The message processing that occurs in the message administration server increases the overall messaging latency of the messaging environment and decreases the overall speed for transmitting data in the data communications environment. Messaging latency is the time period beginning when a message producer transmits an application message and ending when a message consumer receives the application message.

In many data communication environments, even slight increases in messaging latency are costly. Consider, for example, a financial market data environment. A financial market data environment is a data processing environment used to communicate information about financial markets and participants in financial markets. In a financial market data environment, an application message is commonly referred to as a 'tick' and represents financial market data such as, for example, financial quotes or financial news. Financial quotes include bid and ask prices for any given financial security. A 'bid' refers to the highest price a buyer is willing to pay for a security. An 'ask' refers to the lowest price a seller is willing to accept for a security. In a financial market data environment, a message producer may provide quotes for the purchase or sale of financial securities based on real-time financial market conditions, and a message consumer may buy and sell financial securities based on financial quotes. When a message consumer buys or sells a financial security based on the quoted price provided by the message producer, the ability of a message consumer to obtain the bid or ask in the quote for the financial security is largely influenced by messaging latency in the financial market data environment. The higher the messaging latency, the less likely a buy or sell order generated by the message consumer will execute at or near the price stated in the financial quote. In fact, a highly volatile security may fluctuate in price dramatically over a time period of a few seconds.

Current solutions to reduce messaging latency are to remove the message administration server from the messaging environment. In such current solutions, the message sending devices send application messages directly to message receiving devices. The drawback to such current solutions is that removing the message administration server removes the administration functionality provided by the message administration server from the messaging environment. Current solutions, therefore, effectively offer no solution in messaging environments where the administrative functions of a message administration server are required. Consider again the financial market data environment example from above. In such an exemplary financial market data environment, consider that a message receiving device is only authorized to receive financial quotes on certain financial securities or only authorized to receive financial quotes that are at least fifteen minutes old. Removing the message administration server from such a financial market data environment removes the ability to administer the messages received by the message receiving device from the message sending device in the financial market data environment.

An additional drawback to current messaging environments, such as, for example, the one describe above with reference to FIG. 1, involves the situation in which a message administration server receives application messages from both an active message sending device and a backup message sending device, and each message sending device generates the application messages from data received from a plurality of sub-sources. As each message sending device generates the application messages, each message is assigned a message sequence number. Because no guarantee exists that each message sending device will process the data received from the plurality of sub-sources in the same order, the message sending devices often assign the same message sequence number to messages containing different data. When the active message sending device fails, the message administration server receives application messages generated from the backup message sending device and must perform data recovery to identify lost or duplicate data. Because each message sending device may assign the same message sequence number to messages containing different data, message administration servers in current messaging environments cannot rely on the message sequence number to perform data recovery such as eliminating duplicate application messages received from the backup message sending device. Rather, message administration servers must examine the entire contents of each message to determine whether a message administration server has received a duplicate application message during failover. Examining the entire contents of the application message, however, greatly increases messaging latency during a failover from an active message sending device to a backup message sending device. A need, therefore, exists to more efficiently ensure correct and consistent data identification by the message administration server of the contents of the application messages to perform data recovery.

SUMMARY OF THE INVENTION

Methods, apparatus, and products are disclosed for reliable messaging using redundant message streams in a high speed, low latency data communications environment that include brokering, by a stream administration server, establishment of an active message stream to a subscribing client device from an active feed adapter, the active message stream capable of communicating active application messages, each active application message characterized by an active source stream identifier, an active source stream sequence number, and an active message sequence number; brokering, by the stream administration server, establishment of a backup message stream to the subscribing client device from a backup feed adapter, the backup message stream capable of communicating backup application messages representing duplicates of the active application messages, each backup application message characterized by a backup source stream identifier, a backup source stream sequence number, and a backup message sequence number; receiving the active application messages in messaging middleware of the subscribing client device from the active feed adapter; receiving, in response to a failover from the active feed adapter to the backup feed adapter, the backup application messages in the messaging middleware of the subscribing client device from the backup feed adapter; and administering, by the messaging middleware of the subscribing client device, the backup application messages in dependence upon the active stream source identifier, the active stream source sequence number, the backup stream source identifier, and the backup stream source sequence number.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
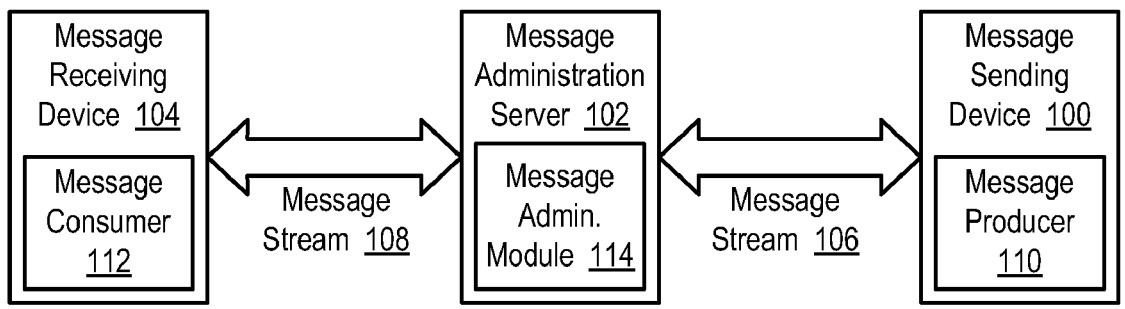
FIG. 1 sets forth a block diagram illustrating a typical messaging environment for data communications.
Figure 2:
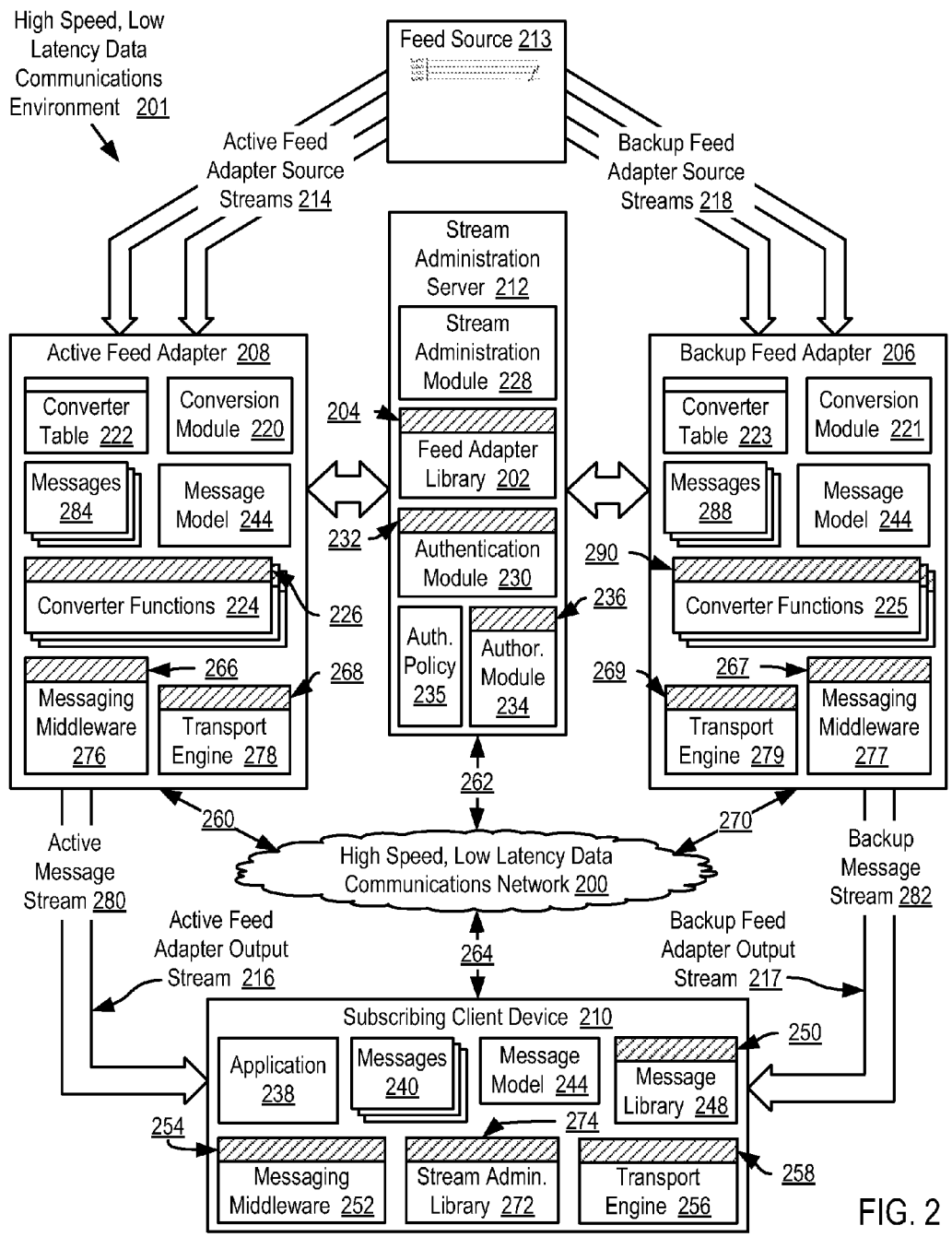
FIG. 2 sets forth a network and block diagram illustrating an exemplary computer data processing system for reliable messaging using redundant message streams in a high speed, low latency data communications environment according to exemplary embodiments of the present invention.

Exemplary methods, apparatus, and products for reliable messaging using redundant message streams in a high speed, low latency data communications environment according to embodiments of the present invention are described with reference to the accompanying drawings, beginning with FIG. 2. FIG. 2 sets forth a network and block diagram illustrating an exemplary computer data processing system for reliable messaging using redundant message streams in a high speed, low latency data communications environment (201) according to embodiments of the present invention. The system of FIG. 2 operates generally for reliable messaging using redundant message streams in a high speed, low latency data communications environment according to embodiments of the present invention as follows. A stream administration server (212) brokers establishment of an active message stream (280) to a subscribing client device (210) from an active feed adapter (208). The active message stream (280) is capable of communicating active application messages where each active application message is characterized by an active source stream identifier, an active source stream sequence number, and an active message sequence number. The stream administration server brokers establishment of a backup message stream (282) to the subscribing client device (210) from a backup feed adapter (206). The backup message stream (282) is capable of communicating backup application messages representing duplicates of the active application messages wherein each backup application message is characterized by a backup source stream identifier, a backup source stream sequence number, and a backup message sequence number. Messaging middleware (252) of the subscribing client device (210) receives the active application messages from the active feed adapter (208). The messaging middleware (252) of the subscribing client device receives the backup application messages from the backup feed adapter (206) in response to a failover from the active feed adapter (208) to the backup feed adapter (206). The messaging middleware (252) of the subscribing client device (210) administers the backup application messages in dependence upon the active stream source identifier, the active stream source sequence number, the backup stream source identifier, and the backup stream source sequence number.

The high speed, low latency data communications environment (201) illustrated in FIG. 2 includes a high speed, low latency data communications network (200). The network (200) includes an active feed adapter (208), a backup feed adapter (206) a stream administration server (212), and a subscribing client device (210), as well as the infrastructure for connecting such devices (206, 208, 212, 210) together for data communications. The network (200) of FIG. 2 is termed 'high speed, low latency' because the application messages sent between devices connected to the network (200) on message streams administered by the stream administration server (212) bypass the stream administration server (212). For example, the application messages on the active message stream (280) from the active feed adapter (208) to the subscribing client device (210) bypass the stream administration server (212). Similarly, the application messages on the backup message stream (282) from the backup feed adapter (206) to the subscribing client device (210) bypass the stream administration server (212). Although such messages are not delayed for processing in the stream administration server (212), the stream administration server (212) retains administration of the streams (280, 282) between devices connected to the high speed, low latency data communications network (200).

Further contributing to the 'high speed, low latency' nature of network (200), readers will note that the network (200) does not include a router, that is a computer networking device whose primary function is to forward data packets across a network toward their destinations. Rather, each device (206, 208, 212, 210) provides its own routing functionality for data communication through a direct connection with the other devices connected to the network (200). Because the network (200) does not include a computer networking device dedicated to routing data packets, the network (200) of FIG. 2 may be referred to as a 'minimally routed network.' Although the exemplary network (200) illustrated in FIG. 2 does not include a router, such a minimally routed network is for explanation only. In fact, some high speed, low latency networks useful in reliable messaging using redundant message streams in a high speed, low latency data communications environment according to embodiments of the present invention may include a router.

As mentioned above, the high speed, low latency data communications environment (201) depicted in FIG. 2 includes two message streams (280, 282). A message stream is a data communication channel between a communications endpoint of a sending device and a communications endpoint of at least one receiving device. A communications endpoint is composed of a network address and a port for a sending device or a receiving device. A message stream may be implemented as a multicast data communication channel. In a multicast data communication channel, a one-to-many relationship exists between a destination address for a message and the communication endpoints of receiving devices. That is, each destination address identifies a set of communication endpoints for receiving devices to which each message of the stream is replicated. A multicast data communication channel may be implemented using, for example, the User Datagram Protocol ('UDP') and the Internet Protocol ('IP'). In addition to a multicast data communication channel, the message stream may be implemented as a unicast data communication channel. In a unicast data communication channel, a one-to-one relationship exists between a destination address for a message and a communication endpoint of a receiving device. That is, each destination address uniquely identifies a single communication endpoint of single receiving device. A unicast data communication channel may be implemented using, for example, the Transmission Control Protocol ('TCP') and IP.

The exemplary system of FIG. 2 includes a stream administration server (212) connected to the high speed, low latency data communications network (200) through a wireline connection (262). The stream administration server (212) of FIG. 2 is a computer device having installed upon it a stream administration module (228), a feed adapter library (202), an authentication module (230), an authorization module (234), and an authorization policy (235). A stream administration module (228) is a set of computer program instructions configured for reliable messaging using redundant message streams in a high speed, low latency data communications environment according to embodiments of the present invention. The stream administration module (228) operates generally for reliable messaging using redundant message streams in a high speed, low latency data communications environment according to embodiments of the present invention by brokering establishment of an active message stream (280) to a subscribing client device (210) from an active feed adapter (208) and brokering establishment of a backup message stream (282) to the subscribing client device (210) from a backup feed adapter (206). In addition, the stream administration module (228) may administer the message streams by providing security services such as authenticating the subscribing client device (210) and authorizing the subscribing client device (210) to receive application messages from the feed adapters (206, 208) on the message streams (280, 282).

The communications between the stream administration module (228) and the feed adapters (206, 208) may be implemented using a feed adapter library (202). The feed adapter library (202) is a set of functions contained in dynamically linked libraries or statically linked libraries available to the stream administration module (228) through a feed adapter library API (204). Through the feed adapter library (202), the stream administration module (228) of the stream administration server (212) may administer the feed adapters (206, 208), including providing to the feed adapters (206, 208) the request for a message stream from a subscribing client device. Functions of the feed adapter library (202) used by the stream administration module (228) may communicate with the active feed adapter (208) through network (200) by calling member methods of a CORBA object, calling member methods of remote objects using the Java Remote Method Invocation ('RMI') API, using web services, or any other communication implementation as will occur to those of skill in the art.

'CORBA' refers to the Common Object Request Broker Architecture, a computer industry specifications for interoperable enterprise applications produced by the Object Management Group ('OMG'). CORBA is a standard for remote procedure invocation first published by the OMG in 1991. CORBA can be considered a kind of object-oriented way of making remote procedure calls, although CORBA supports features that do not exist in conventional RPC. CORBA uses a declarative language, the Interface Definition Language ("IDL"), to describe an object's interface. Interface descriptions in IDL are compiled to generate 'stubs' for the client side and 'skeletons' on the server side. Using this generated code, remote method invocations effected in object-oriented programming languages, such as C++ or Java, look like invocations of local member methods in local objects.

The Java™ Remote Method Invocation API is a Java application programming interface for performing remote procedural calls published by Sun Microsystems™. The Java™ RMI API is an object-oriented way of making remote procedure calls between Java objects existing in separate Java™ Virtual Machines that typically run on separate computers. The Java™ RMI API uses a remote procedure object interface to describe remote objects that reside on the server. Remote procedure object interfaces are published in an RMI registry where Java clients can obtain a reference to the remote interface of a remote Java object. Using compiled 'stubs' for the client side and 'skeletons' on the server side to provide the network connection operations, the Java RMI allows a Java client to access a remote Java object just like any other local Java object.

In addition to administering the feed adapters (206, 208), the stream administration module (228) of FIG. 2 administers the message streams by providing security services such as, for example, authenticating the subscribing client device (210) and authorizing the subscribing client device (210) to receive application messages from the feed adapters (206, 208) on the message streams (280, 282). The authentication module (230) of FIG. 2 is a set of computer program instructions capable of providing authentication security services to the stream administration module (228) through an exposed authentication application programming interface ('API') (232). Authentication is a process verifying the identity of an entity. In the exemplary system of FIG. 2, the authentication module (230) verifies the identity of the subscribing client device (210). The authentication module (230) may provide authentication security services using a variety of security infrastructures such as, for example, shared-secret key infrastructure or a public key infrastructure.

The authorization module (234) of FIG. 2 is a set of computer program instructions capable of providing authorization security services to the stream administration module (228) through an exposed authorization API (236). Authorization is a process of only allowing resources to be used by resource consumers that have been granted authority to use the resources. In the example of FIG. 2, the authorization module (234) identifies the application messages that the subscribing client device (210) is authorized to receive on the message streams (280, 282). The authorization module (234) of FIG. 2 provides authorization security services using an authorization policy (235). The authorization policy (235) is a set of rules governing the privileges of authenticated entities to send or receive application messages on a message stream. In a financial market data environment, for example, an authenticated entity may be authorized to receive application messages that include financial quotes for some financial securities but not other securities. The authorization policy (235) may grant privileges on the basis of an individual entity or an entity's membership in a group.

In the exemplary system of FIG. 2, active feed adapter (208) is connected to the high speed, low latency data communications network (200) through a wireline connection (260). The active feed adapter (208) is a computer device having the capabilities of converting application messages on active feed adapter source streams (214) having a first format to application messages on a active feed adapter output stream (216) having a second format and transmitting the application messages on the active feed adapter output stream (216) to subscribing client devices. The active feed adapter source streams (214) of FIG. 2 are message streams from a feed source to the active feed adapter (208). The active feed adapter output stream (216) of FIG. 2 is a message stream administered by the stream administration server (212) from the active feed adapter (208) to the subscribing client device (210). Although active feed adapter receives application messages having a first format on the active feed adapter source streams (214) and transmits application messages having a second format on the active feed adapter output stream (216), readers will note that application messages received on a feed adapter source stream are referred to in this specification as 'source stream messages' to distinguish such messages from the application messages transmitted to a subscribing client device on a feed adapter output stream.

In the example of FIG. 2, the active feed adapter (208) receives active source stream messages on the active feed adapter source streams (214) from a feed source (213). The feed source (213) is a computer device capable of aggregating data into source stream messages and transmitting the messages to a feed adapter on one or more feed adapter source streams. In a financial market data environment, for example, a feed source (213) may be implemented as a feed source controlled by the Options Price Reporting Authority ('OPRA'). OPRA is the securities information processor for financial market information generated by the trading of securities options in the United States. The core information that OPRA disseminates is last sale reports and quotations. Other examples of feed sources in financial market data environment may include feed sources controlled by the Consolidated Tape Association ('CTA') or The Nasdaq Stock Market, Inc. The CTA oversees the dissemination of real-time trade and quote information in New York Stock Exchange and American Stock Exchange listed securities. The Nasdaq Stock Market, Inc. operates the NASDAQ Market Center$^{SM}$ which is an electronic screen-based equity securities market in the United States. In a financial market data environment, a feed adapter source stream is referred to as a 'financial market data feed.'

Readers will note that FIG. 2 illustrates two active feed adapter source streams (214). Each feed adapter source stream (214) of FIG. 2 is identified in the active feed adapter by an active source stream identifier. The feed source (213) of FIG. 2 may transmit source stream messages to the active feed adapter (208) using more than one feed adapter source stream because the bandwidth required to transmit the messages on a single source stream is not available. In a financial market data environment, for example, a feed source may transmit ticks for financial securities whose ticker symbol begins with the letters 'A' through 'M' on one message stream and transmit ticks for the financial securities that begin with the letters 'N' through 'Z' on another message stream.

The active feed adapter (208) of FIG. 2 has installed upon it a conversion module (220), a converter table (222), converter functions (224), messages (284), message model (244), messaging middleware (276), and a transport engine (278). The conversion module (220) is a set of computer program instructions for converting source stream messages received on the active feed adapter source streams (214) having a first format into application messages having a second format for transmission to subscribing devices on the active feed adapter output stream (216).

Furthermore, the conversion module (220) is a set of computer program instructions for reliable messaging using redundant message streams in a high speed, low latency data communications environment according to embodiments of the present invention. The conversion module (220) operates generally for reliable messaging using redundant message streams in a high speed, low latency data communications environment according to embodiments of the present invention by receiving active source stream messages on a plurality of feed adapter source streams where each active source stream message is characterized by an active source stream sequence number for the feed adapter source stream on which the active source stream message was received, converting each active source stream message to an active application message, including adding to the contents of each active source stream message the value of the active source stream identifier for the feed adapter source stream on which the active source stream message was received in the active feed adapter and an active message sequence number, receiving an administrative source stream message on a feed adapter source stream, and converting the administrative source stream message into an administrative application message.

The conversion module (220) converts application messages from the first format to the second format according to the converter table (222). The converter table (222) of FIG. 2 is a table that specifies the converter functions (224) capable of converting an application message from one format to another format. Utilizing multiple converter tables, the conversion module (220) may convert messages from a variety of input formats to a variety of output formats. In the example of FIG. 2, the converter table (222) specifies the converter functions (224) capable of converting the active source stream messages received from the active feed adapter source streams (214) having the first format to application messages having the second format for transmission to subscribing client devices on the active feed adapter output stream (216). That is, the converter table (222) specifies the converter functions (224) capable of converting an active source stream message to an active application message, including adding to the contents of each active source stream message the value of the active source stream identifier for the feed adapter source stream on which the active source stream message was received in the active feed adapter and an active message sequence number. In addition, the converter table (222) specifies the converter functions (224) capable of converting an administrative source stream message into an administrative application message. An administrative source stream message is an application message received from a feed source that contains administrative information. The converter table (222) of FIG. 2 may be implemented using a structured document such as, for example, an extensible Markup Language ('XML') document.

The converter functions (224) of FIG. 2 are functions capable of converting data fields in an application message from one format to another format or converting values of data fields from one value to another value. Converter functions (224) may, for example, convert a 16-bit integer to a 32-bit integer, convert a number stored in a string field to a 64-bit double floating point value, increase the value of a particular data field by one, or any other conversion as will occur to those of skill in the art. The conversion module (220) of FIG. 2 accesses the converter functions (224) through a set of converter function APIs (226) exposed by the converter functions (224).

In the example of FIG. 2, conversion module (220) uses the converter functions (224) to convert active source stream messages to active application messages (284). The application messages (284) of FIG. 2 represent the active application messages for transmission to the subscribing client device (210). The format of the messages (284) is specified in the message model (244). The message model (244) is metadata that defines the structure and the format of the messages (284). The message model (244) may be attached to and transmitted along with the application messages (284) to the subscribing client device (210). More often, however, the subscribing client device (210) and the feed adapters (206, 208) may receive the message model (244) or its identifier from the stream administration server (212) when the stream administration server (212) brokers the message stream (280). A message model may be implemented using a structured document, such as, for example, an XML document, a Java object, C++ object, or any other implementation as will occur to those of skill in the art.

Before the conversion module (220) of FIG. 2 performs data processing on the source stream messages, the conversion module (220) receives the source stream messages from the feed source (213). The conversion module (220) of FIG. 2 may receive the source stream messages through a receiving transport engine (not shown) of the active feed adapter (208). The receiving transport engine is a software module that operates in the transport layer of the network stack and may be implemented according to the TCP/IP protocols, UDP/IP protocols, or any other data communication protocol as will occur to those of skill in the art. The receiving transport engine may provide the received source stream messages directly to the conversion module (220) or to the messaging middleware (276), which in turn, provides the source stream messages to the conversion module.

The messaging middleware (276) of FIG. 2 is a software component that provides high availability services between the active feed adapter (208), the backup feed adapter (206), and the subscribing client device (210), and provides synchronization services between the active feed adapter (208) and the backup feed adapter (206). Messaging middleware (276) of FIG. 2 provides synchronization services through a data communications channel between the active feed adapter (208) and the backup feed adapter (206) using, for example, member methods of an RMI object, member methods of a CORBA object, web services, or any other communication implementation as will occur to those of skill in the art. After the conversion module (220) of FIG. 2 receives application messages from the feed source (213) and performs data processing on the application messages, the messaging middleware (276) receives the application messages from the conversion module (220) and provides the received application messages to the transport engine (278) for transmission to a subscribing client device on the active feed adapter output stream (216). The conversion module (220) interacts with the messaging middleware (276) through a messaging middleware API (266) exposed by the messaging middleware (276).

In addition, the messaging middleware (276) of FIG. 2 includes a set of computer program instructions configured for reliable messaging using redundant message streams in a high speed, low latency data communications environment according to embodiments of the present invention. The messaging middleware (276) of FIG. 2 operates generally for reliable messaging using redundant message streams in a high speed, low latency data communications environment according to embodiments of the present invention by identifying a value for an active message sequence number that specifies a point in a transmission sequence when the active feed adapter will transmit the administrative application message to the subscribing client device, transmitting, to the backup feed adapter, the administrative application message and the value for the identified active message sequence number, and transmitting, to the subscribing client device, the administrative application message on the active message stream at the point in the transmission sequence identified by the active message sequence number.

The transport engine (278) of FIG. 2 is a software component operating in the transport and network layers of the OSI protocol stack promulgated by the International Organization for Standardization. The transport engine (278) provides data communications services between network-connected devices. The transport engine may be implemented according to the UDP/IP protocols, TCP/IP protocols, or any other data communications protocols as will occur to those of skill in the art. The transport engine (278) includes a set of computer program instructions capable of encapsulating the application messages provided by the messaging middleware (276) into packets and transmitting the packets through the active message stream (280) to the subscribing client device (210). The messaging middleware (276) operates the transport engine (278) through a transport API (268) exposed by the transport engine (278).

In the exemplary system of FIG. 2, backup feed adapter (206) is connected to the high speed, low latency data communications network (200) through a wireline connection (270). The backup feed adapter (206) is a computer device having the capabilities of converting backup messages on backup feed adapter source streams (218) having a first format to backup messages on a backup feed adapter output stream (217) having a second format and transmitting the backup messages on the backup feed adapter output stream (217) to subscribing client devices. The backup feed adapter source streams (218) are message streams from the feed source (213) to the backup feed adapter (206). The backup feed adapter output stream (217) is a message stream administered by the stream administration server (212) from the backup feed adapter (206) to the subscribing client device (210).

The backup feed adapter (206) of FIG. 2 has installed upon it a conversion module (221), a converter table (223), converter functions (225) that expose converter function APIs (290), backup application messages (288) for transmission from the backup feed adapter (206) to the subscribing client device (210), message model (244), messaging middleware (277) that exposes messaging middleware API (267), and a transport engine (279) that exposes a transport engine API (269). The components installed on the backup feed adapter (206) operate in a manner similar to the components installed on the active feed adapter (208).

In addition, the messaging middleware (277) of the backup feed adapter (206) of FIG. 2 includes a set of computer program instructions for reliable messaging using redundant message streams in a high speed, low latency data communications environment according to embodiments of the present invention. The messaging middleware (277) of FIG. 2 operates generally for reliable messaging using redundant message streams in a high speed, low latency data communications environment according to embodiments of the present invention by receiving, from the active feed adapter, an administrative application message and a value for an active message sequence number that specifies a point in a transmission sequence when the active feed adapter will transmit the administrative application message to the subscribing client device; identifying a value for a backup message sequence number of a most recent backup application message processed in the backup feed adapter prior to receiving the administrative application message; and determining whether the backup feed adapter is capable of synchronizing transmission of the administrative application message to the subscribing client device on the backup message stream in dependence upon the value for the received active message sequence number, the value for the backup sequence number of the most recent message transmitted to the client device, and a predetermined synchronization sequence number threshold; adding a backup message sequence number to the contents of the administrative application message having a value that matches the value of the active message sequence number; transmitting, to the subscribing client device, the administrative application message in sequence with the other backup application messages; slowing down the transmission rate at which the backup feed adapter transmits the backup application message to the subscribing client device; and negotiating, with the active feed adapter, another message sequence number for synchronizing transmission of the administrative application messages to the subscribing client device.

The subscribing client device (210) in exemplary system of FIG. 2 connects to the high speed, low latency data communications network (200) through a wireline connection (264). The subscribing client device (210) of FIG. 2 is a computer device capable of subscribing to the message streams transmitted by various feed adapters. In a financial market data environment, for example, a subscribing client device may subscribe to a tick to receive the bid and ask prices for a particular security on a message stream provided by a feed adapter controlled by a financial securities broker.

In the example of FIG. 2, the subscribing client device (210) has installed upon it an application (238), a message library (248), a stream administration library (272), messaging middleware (252), and a transport engine (256). The application (238) of FIG. 2 is a software component that processes data contained in the application messages (240)

received from one of the feed adapters (208, 206). The application (238) may process the data for utilization by the subscribing client device (210) itself, for contributing the data to another feed adapter, or for contributing the data to some other device. In a financial market data environment, the application installed on the subscribing client device may be a program trading application that buys or sells financial securities based on the quoted prices contained in ticks. The application may also be a value-adding application that contributes information to a tick such as, for example, the best bid and ask prices for a particular security, that is not typically included in the ticks provided by the feed source (213). The subscribing client device may then transmit the ticks to a feed adapter for resale to other subscribing client devices.

In the example of FIG. 2, the application messages (240) represent application messages received from one of the feed adapters (206, 208) and having a format specified by the message model (244). The application (238) of FIG. 2 processes the data contained in the application messages (240) using the message library (248). The message library (248) is a set of functions that are computer program instructions for creating, accessing, and manipulating messages (240) according to the message model (244). The message library (248) is accessible to the application (238) through a message API (250) exposed by the message library (248).

The communications between the subscribing client device (210) and the stream administration server (212) may be implemented using a stream administration library (272). The stream administration library (272) is a set of functions contained in dynamically linked libraries or statically linked libraries available to the application (238) through a stream administration library API (274). Through the stream administration library (272), the application (238) of the subscribing client device (210) may, for example, request to subscribe to messages from a feed adapter, modify an existing message subscription, or cancel a message subscription. Functions of the stream administration library (272) used by the application (238) may communicate with the stream administration server (212) through network (200) by calling member methods of a CORBA object, calling member methods of remote objects using the Java RMI API, using web services, or any other communication implementation as will occur to those of skill in the art.

Before the application (238) processes the data contained in the messages (240), the application (238) receives the messages (240) from the messaging middleware (252), which, in turn, receives the application messages (240) from one of the feed adapter (208, 206) through the transport engine (256). The messaging middleware (252) is a software component that provides high availability services between the subscribing client device, the active feed adapter (208), and the backup feed adapter (206). In addition, the messaging middleware (252) provides message administration services for the stream administration server (212). Such message administration services may include restricting the ability of the application (238) to send and receive messages on a message stream to messages that satisfy certain constraints. The application (238) and the stream administration library (272) interact with the messaging middleware (252) through a messaging middleware API (254).

In addition, the messaging middleware (252) of FIG. 2 includes a set of computer program instructions for reliable messaging using redundant message streams in a high speed, low latency data communications environment according to embodiments of the present invention. The messaging middleware (252) of FIG. 2 operates generally for reliable messaging using redundant message streams in a high speed, low latency data communications environment according to embodiments of the present invention by receiving the active application messages from the active feed adapter; receiving, in response to a failover from the active feed adapter to the backup feed adapter, the backup application messages in the messaging middleware of the subscribing client device from the backup feed adapter; and administering, by the messaging middleware of the subscribing client device, backup application messages in dependence upon the active stream source identifier, the active stream source sequence number, the backup stream source identifier, and the backup stream source sequence number.

The transport engine (256) of FIG. 2 is a software component operating in the transport and network layers of the OSI protocol stack promulgated by the International Organization for Standardization. The transport engine (256) provides data communications services between network-connected devices. The transport engine may be implemented according to the UDP/IP protocols, TCP/IP protocols, or any other data communications protocols as will occur to those of skill in the art. The transport engine (256) is a software component that includes a set of computer program instructions for receiving packets through the message streams (280, 282) from the feed adapters (208, 206), unencapsulating the application messages from the received packets, and providing the application messages to the messaging middleware (252). The messaging middleware (252) operates the transport engine (256) through a transport API (258) exposed by the transport engine (256).

The servers and other devices illustrated in the exemplary system of FIG. 2 are for explanation, not for limitation. Devices useful in reliable messaging using redundant message streams in a high speed, low latency data communications environment according to embodiments of the present invention may be implemented using general-purpose computers, such as, for example, computer servers or workstations, hand-held computer devices, such as, for example, Personal Digital Assistants ('PDAs') or mobile phones, or any other automated computing machinery configured for data processing according to embodiments of the present invention as will occur to those of skill in the art.

The arrangement of servers and other devices making up the exemplary system illustrated in FIG. 2 are for explanation, not for limitation. Although the connections to the network (200) of FIG. 2 are depicted and described in terms of wireline connections, readers will note that wireless connections may also be useful according to various embodiments of the present invention. Furthermore, data processing systems useful according to various embodiments of the present invention may include additional servers, routers, other devices, and peer-to-peer architectures, not shown in FIG. 2, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Various embodiments of the present invention may be implemented on a variety of hardware platforms in addition to those illustrated in FIG. 2.

Reliable messaging using redundant message streams in a high speed, low latency data communications environment in accordance with the present invention in some embodiments may be implemented with one or more subscribing client devices, stream administration servers, and feed adapters, computers, that is, automated computing machinery. For further explanation, therefore, FIG. 3 sets forth a block diagram of automated computing machinery comprising an example of a subscribing client device (210) useful in reliable messaging using redundant message streams in a high speed, low latency data communications environment according to embodiments of the present invention. The subscribing client device (210) of FIG. 3 includes at least one computer processor (156) or 'CPU' as well as random access memory (168) ('RAM') which is connected through a high speed memory bus (166) and bus adapter (158) to processor (156) and to other components of the subscribing client device.

Stored in RAM (168) are an application (238), application messages (240), message model (244), a message library (248), a messaging middleware (252), a stream administration library (272), and a transport engine (256). Each application message (240) is a quantity of data that includes one or more data fields and is transmitted from one device to another on a message stream. Application messages are typically created and processed by applications operating in application layers above the network and transport layers of a network protocol stack. As mentioned above, an application message may represent numeric or textual information, images, encrypted information, computer program instructions, and so on. In a financial market data environment, for example, a message is commonly referred to as a 'tick' and represents financial market data such as, for example, financial quotes or financial news. Each application message (240) may be implemented using a structured document such as, for example, an XML document, a Java object, C++ object, or any other implementation as will occur to those of skill in the art. The message model (244) is metadata that defines the structure and format of the messages (240). The message model (244) may also be implemented using a structured document such as, for example, an XML document, a Java object, C++ object, or any other implementation as will occur to those of skill in the art. The application (238), the message library (248), the messaging middleware (252), the stream administration library (272), and the transport engine (256) illustrated in FIG. 3 are software components, that is computer program instructions, that operate as described above with reference to FIG. 2.

Also stored in RAM (168) is an operating system (154). Operating systems useful in subscribing client devices according to embodiments of the present invention include UNIX™, Linux™, Microsoft NT™, IBM's AIX™, IBM's i5/OS™, and others as will occur to those of skill in the art. The operating system (154), the application (238), the messages (240), the message model (244), the message library (248), the messaging middleware (252), and the transport engine (256) in the example of FIG. 3 are shown in RAM (168), but many components of such software typically are stored in non-volatile memory also, for example, on a disk drive (170).

Figure 3:
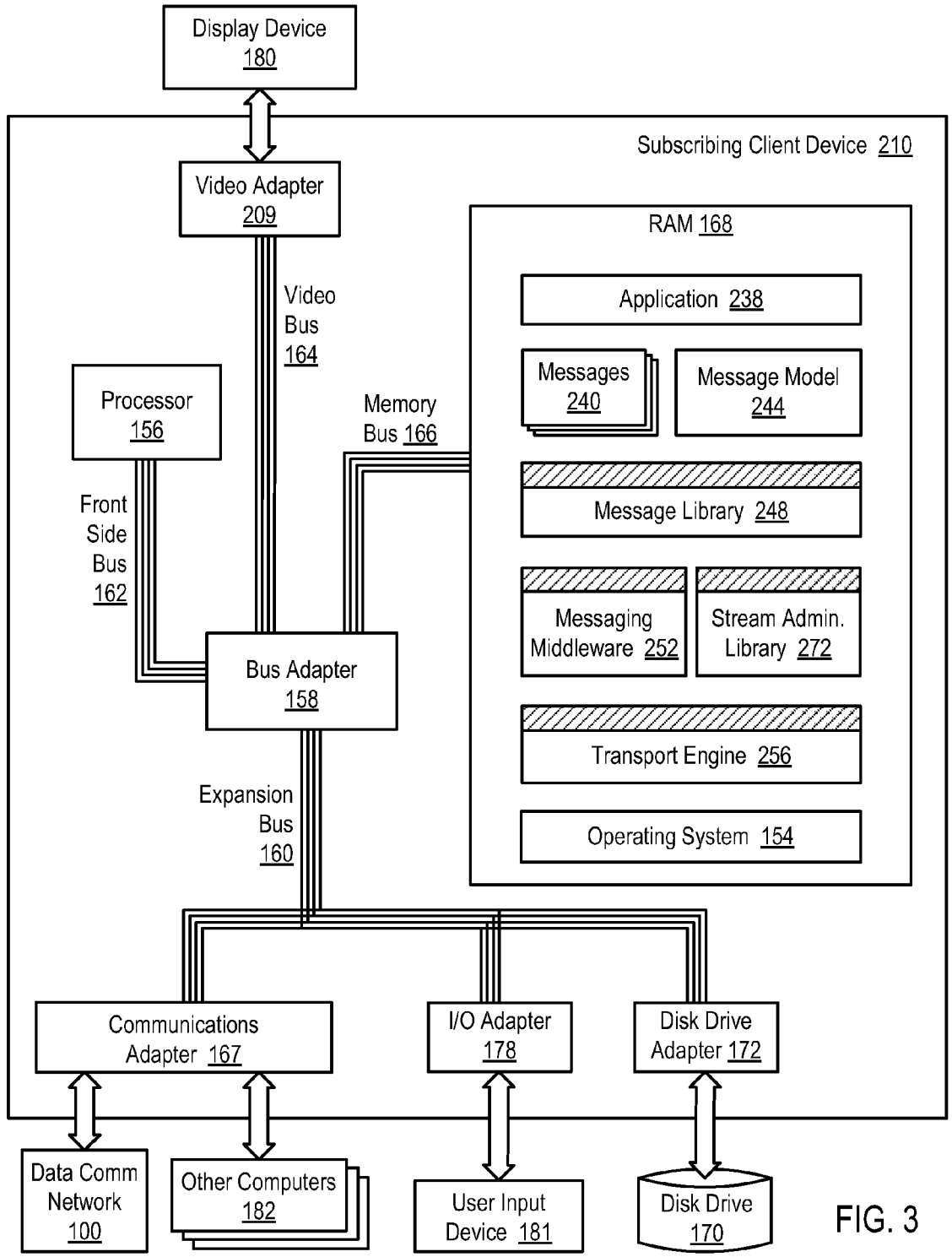
FIG. 3 sets forth a block diagram of automated computing machinery comprising an example of a subscribing client device useful in reliable messaging using redundant message streams in a high speed, low latency data communications environment according to exemplary embodiments of the present invention.

The exemplary subscribing client device (210) of FIG. 3 includes bus adapter (158), a computer hardware component that contains drive electronics for high speed buses, the front side bus (162), the video bus (164), and the memory bus (166), as well as drive electronics for the slower expansion bus (160). Examples of bus adapters useful in subscribing client devices useful according to embodiments of the present invention include the Intel Northbridge, the Intel Memory Controller Hub, the Intel Southbridge, and the Intel I/O Controller Hub. Examples of expansion buses useful in subscribing client devices useful according to embodiments of the present invention may include Peripheral Component Interconnect ('PCI') buses and PCI Express ('PCIe') buses.

The exemplary subscribing client device (210) of FIG. 3 also includes disk drive adapter (172) coupled through expansion bus (160) and bus adapter (158) to processor (156) and other components of the exemplary subscribing client device (210). Disk drive adapter (172) connects non-volatile data storage to the exemplary subscribing client device (210) in the form of disk drive (170). Disk drive adapters useful in subscribing client devices include Integrated Drive Electronics ('IDE') adapters, Small Computer System Interface ('SCSI') adapters, and others as will occur to those of skill in the art. In addition, non-volatile computer memory may be implemented for a subscribing client device as an optical disk drive, electrically erasable programmable read-only memory (so-called 'EEPROM' or 'Flash' memory), RAM drives, and so on, as will occur to those of skill in the art.

The exemplary subscribing client device (210) of FIG. 3 includes one or more input/output ('I/O') adapters (178). I/O adapters in subscribing client devices implement user-oriented input/output through, for example, software drivers and computer hardware for controlling output to display devices such as computer display screens, as well as user input from user input devices (181) such as keyboards and mice. The exemplary subscribing client device (210) of FIG. 3 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary subscribing client device (210) of FIG. 3 includes a communications adapter (167) for data communications with other computers (182) and for data communications with a high speed, low latency data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for reliable messaging using redundant message streams in a high speed, low latency data communications environment according to embodiments of the present invention include modems for wired dial-up communications, IEEE 802.3 Ethernet adapters for wired data communications network communications, and IEEE 802.11b adapters for wireless data communications network communications.

Although FIG. 3 is discussed with reference to exemplary subscribing client devices, readers will note that automated computing machinery comprising exemplary stream administration servers and exemplary feed adapters useful in reliable messaging using redundant message streams in a high speed, low latency data communications environment according to embodiments of the present invention are similar to the exemplary subscribing client device (210) of FIG. 3. That is, such exemplary stream administration servers and feed adapters include one or more processors, bus adapters, buses, RAM, video adapters, communications adapters, I/O adapters, disk drive adapters, and other components similar to the exemplary subscribing client device (210) of FIG. 3 as will occur to those of skill in the art.

Figure 4:
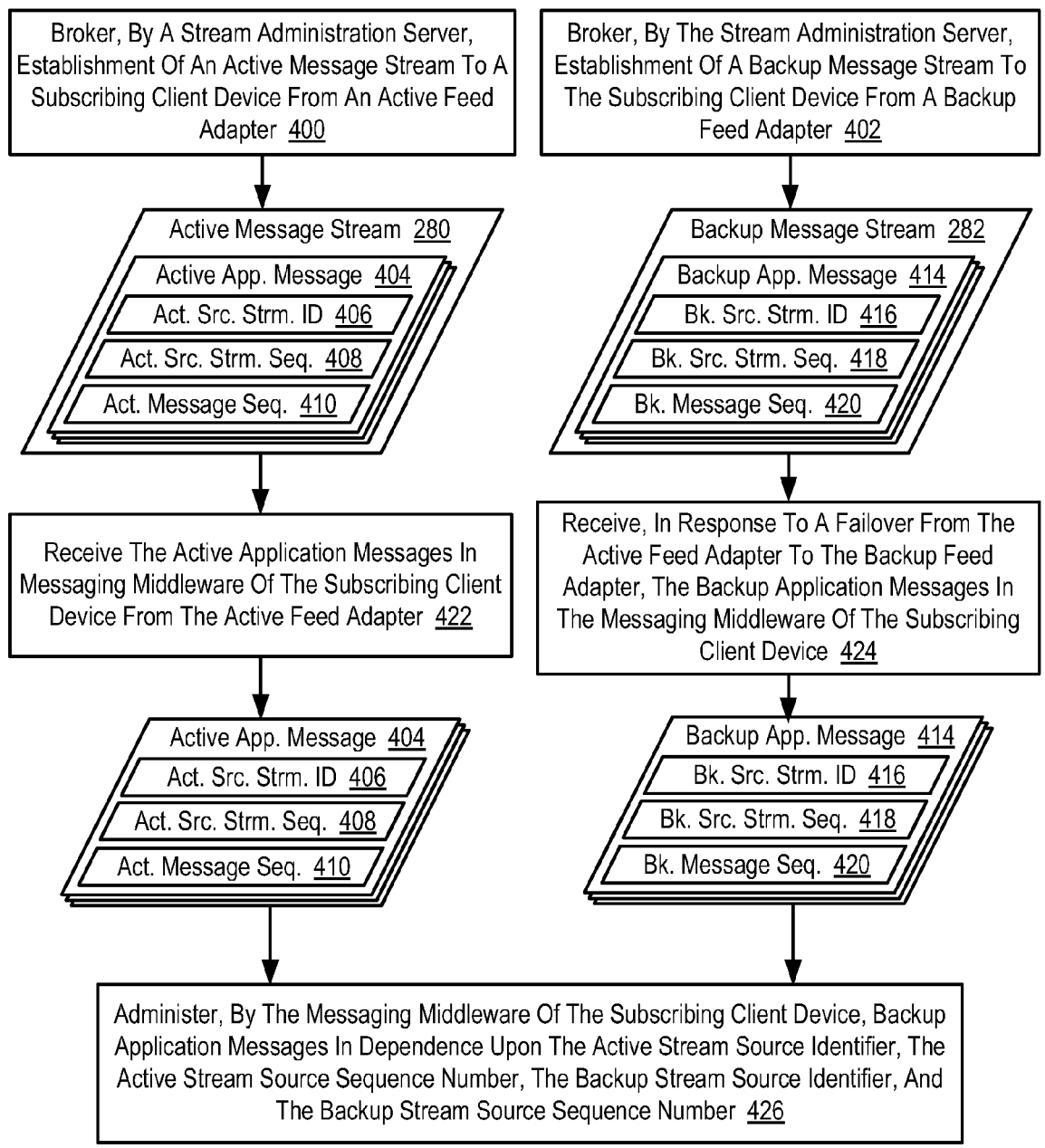
FIG. 4 sets forth a flowchart illustrating an exemplary method for reliable messaging using redundant message streams in a high speed, low latency data communications environment according to exemplary embodiments of the present invention.

For further explanation, FIG. 4 sets forth a flowchart illustrating an exemplary method for reliable messaging using redundant message streams in a high speed, low latency data communications environment according to embodiments of the present invention. The method of FIG. 4 includes brokering (400), by a stream administration server, establishment of an active message stream (280) to a subscribing client device from an active feed adapter. The active message stream (280) of FIG. 4 represents a data communication channel between a communications endpoint of a subscribing client device and a communications endpoint of a feed adapter. A message stream may be implemented as a multicast data communication channel using the UDP/IP protocols or a unicast data communication channel using TCP/IP protocols as discussed above with reference to FIG. 2.

In the example of FIG. 4, the active message stream (280) is capable of communicating active application messages (404) from the active feed adapter to the subscribing client device. The active application messages (404) represent application messages received by a subscribing client device from an active feed adapter. Each active application message (404) of FIG. 4 is characterized by an active source stream identifier (406), an active source stream sequence number (408), and an active message sequence number (410). The active source stream identifier (406) represents a feed adapter source stream through which the active feed adapter received an active source stream message that was converted into the active application message (404). The active source stream sequence number (408) represents the sequence number that uniquely identifies the active source stream message that was converted in to the active application message (404) among other active source stream messages received by the active feed adapter on the same source stream. The active source stream sequence number (408) also provides the relative transmission order for a particular active source stream message with respect to the other active source stream messages received in the active feed adapter. The active message sequence number (410) represents a sequence number that uniquely identifies the active application message among other application messages transmitted from a particular active feed adapter. Similar to the active source stream sequence number (408), the active message sequence number (410) also provides the relative transmission order for a particular active application message with respect to the other active application messages transmitted from the active feed adapter.

In the method of FIG. 4, brokering (400), by a stream administration server, establishment of an active message stream (280) to a subscribing client device from an active feed adapter may be carried out by receiving a subscription request from a subscribing client device to subscribe to messages from a feed adapter. The subscription request may be implemented as an XML document, a call to a member method of a RMI object on the subscribing client device, or any other implementation as will occur to those of skill in the art. The subscription request may include topics of the messages that the subscribing client device requests to receive from the feed adapter. A topic represents the characteristics of the messages that the subscribing client device requests. Using a topic, a subscribing client device may specify the group of messages for receipt from the feed adapter. In a financial market data environment, for example, a subscribing client device may use a topic to request ticks from an OPRA feed source that contains quotes of an IBM option traded on the Chicago Board Options Exchange ('CBOE') that includes the best bid and best ask for the IBM option on the CBOE.

Brokering (400), by a stream administration server, establishment of an active message stream (280) to a subscribing client device from an active feed adapter according to the method of FIG. 4 may also include providing the subscribing client device a destination address for the feed adapter. The destination address for the feed adapter is a multicast address or a unicast address used by the subscribing client device to listen for messages from a feed adapter. Using the destination address provided by the stream administration server, the subscribing client device may establish the active message stream (280) from the feed adapter to the subscribing client device.

Before the stream administration server provides the destination address for the feed adapter, the stream administration server in the example of FIG. 4 may perform several security services to ensure that the subscribing client device only receives messages from the feed adapter for which the subscribing client device is authorized to receive. In the method of FIG. 4, brokering (400), by a stream administration server, establishment of an active message stream (280) to a subscribing client device from an active feed adapter may also be carried out by authenticating the subscribing client device and authorizing the subscribing client device to receive messages from the feed adapter on the message stream (280). Authenticating the subscribing client device may be carried out by verifying client security credentials provided by the subscribing client device with the subscription request. The client security credentials may be implemented as a digital signature in a public key infrastructure, a security token, or any other security data as will occur to those of skill in the art for authenticating the identity of the originator of the subscription request. Authorizing the subscribing client device to receive messages from the feed adapter on the message stream (280) may be carried out by identifying the privileges associated with the authenticated subscribing client device in dependence upon an authorization policy. An authorization policy is a set of rules governing the privileges of authenticated subscribing client devices requesting to receive data from a feed adapter.

The method of FIG. 4 also includes brokering (402), by the stream administration server, establishment of a backup message stream (282) to the subscribing client device from a backup feed adapter. In the example of FIG. 4, brokering (402), by the stream administration server, establishment of a backup message stream (282) to the subscribing client device from a backup feed adapter may be carried out in a manner similar to brokering (400), by a stream administration server, establishment of an active message stream (280) to a subscribing client device from an active feed adapter as described above.

The backup message stream (282) of FIG. 4 represents a data communication channel between a communications endpoint of a subscribing client device and a communications endpoint of a feed adapter. In the example of FIG. 4, the backup message stream (282) is capable of communicating backup application messages (414) from the backup feed adapter to the subscribing client device. The backup application messages (414) represent application messages received by a subscribing client device from a backup feed adapter. Each backup application message (414) of FIG. 4 is characterized by a backup source stream identifier (416), a backup source stream sequence number (418), and a backup message sequence number (420). The backup source stream identifier (416) represents a feed adapter source stream through which the backup feed adapter received a backup source stream message that was converted into the backup application message (414). The backup source stream sequence number (418) is the sequence number that uniquely identifies the backup source stream message that was converted into the backup application message (414) among other backup source stream messages received by the backup feed adapter on a particular source stream. The backup source stream sequence number (418) also provides the relative transmission order for a particular backup source stream message with respect to the other backup source stream messages received in the backup feed adapter. The backup message sequence number (420) is a sequence number that uniquely identifies the backup application message among other application messages transmitted from a particular backup feed adapter. A backup message sequence number also provides the relative transmission order for a particular backup application message with respect to the other backup application messages transmitted from the backup feed adapter.

In the example of FIG. 4, at least some of the backup application messages (414) represent duplicates of active application messages (404) previously received in the messaging middleware of the subscribing client device. As mentioned above, there is no guarantee that the active feed adapter and the backup feed adapter will convert the source stream messages into application messages in the same order. The subscribing client device, therefore, cannot rely only on the message sequence numbers (410, 420) to identify duplicate messages. The subscribing client device may, however, rely on the source stream identifiers (406, 416) and the source stream sequence numbers (408, 410) to identify duplicate messages because the contents of an active application message (404) having a particular combination of values for the active source stream identifier (406) and the active source stream sequence number (408) is duplicated by the contents of a backup application message (414) having the same combination of values for the backup source stream identifier (416) and the active source stream sequence number (418).

The method of FIG. 4 also includes receiving (422) the active application messages (404) in messaging middleware of the subscribing client device from the active feed adapter. Receiving (422) the active application messages (404) in messaging middleware of the subscribing client device from the active feed adapter according to the method of FIG. 4 may be carried out by receiving transport packets, such as, for example, TCP packets or UDP packets, that contain the active application messages (404) and unencapsulating the messages (404) from the transport packets.

The method of FIG. 4 also includes receiving (424), in response to a failover from the active feed adapter to the backup feed adapter, the backup application messages (414) in the messaging middleware of the subscribing client device from the backup feed adapter. Failover is the process of transitioning from a failed active component to a redundant backup component. Failover may result from a hardware or software failure on the active feed adapter, damage to the network infrastructure connected to the active feed adapter, or any other cause as will occur to those of skill in the art. Receiving (424), in response to a failover from the active feed adapter to the backup feed adapter, the backup application messages (414) in the messaging middleware of the subscribing client device from the backup feed adapter according to the method of FIG. 4 may be carried out by receiving transport packets, such as, for example, TCP packets or UDP packets, from the backup feed adapter that contain the backup application messages (414) and unencapsulating the messages (414) from the transport packets.

The method of FIG. 4 also includes administering (426), by the messaging middleware of the subscribing client device, backup application messages (414) in dependence upon the active stream source identifier (406), the active stream source sequence number (408), the backup stream source identifier (416), and the backup stream source sequence number (418). Administering (426) the backup application messages (414) according to the method of FIG. 4 may be carried out by identifying whether a received backup application message is a duplicate of a previously received active application message, and discarding the backup application message if backup application message is a duplicate of a previously received active application message. The messaging middleware of the subscribing client device may identify whether a backup application message is a duplicate of a previously received active application message by comparing values for the backup source stream identifier (416) and the backup source stream sequence number (418) of a backup application message (414) with the values of the active source stream identifier (406) and the active source stream sequence number (408) of the previously received active application messages (404). A backup application message (404) is a duplicate of an active application message (414) if a previously received active application message (404) has the same combination of values for the active source stream identifier (406) and the active source stream sequence number (408) as the combination of values for the backup source stream identifier (416) and the backup source stream sequence number (418) of the backup application message (414).

Readers will note that carrying out administering (426) the backup application messages (414) according to the method of FIG. 4 by discarding the backup application message if backup application message is a duplicate of a previously received active application message is for explanation and not for limitation. In fact, administering (426) the backup application messages (414) according to the method of FIG. 4 may also be carried out by discarding the previously received active application messages if a duplicate backup application message has been received and passing the duplicate backup application message to application software for further data processing that operates in the application layer of a network protocol stack.

As mentioned above, a feed adapter converts source stream messages into applications messages for transmission to a subscribing client device. For further explanation, therefore, FIG. 5 sets forth a flowchart illustrating a further exemplary method for reliable messaging using redundant message streams in a high speed, low latency data communications environment according to embodiments of the present invention that includes receiving (500), in the active feed adapter, active source stream messages (504) on a plurality of feed adapter source streams (502, 506) and converting (512), by the active feed adapter, each active source stream message (504) to an active application message (404).

Figure 5:
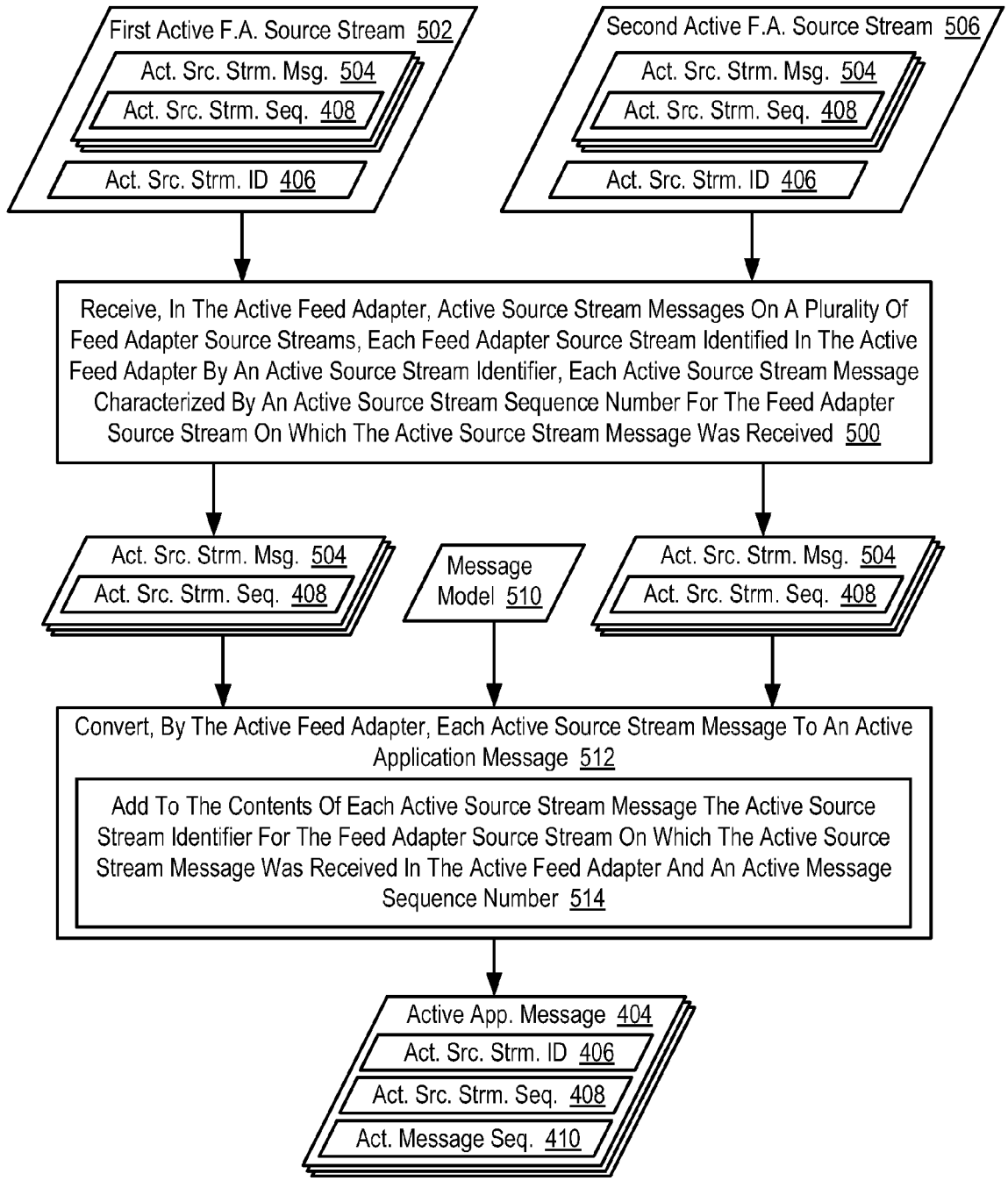
FIG. 5 sets forth a flowchart illustrating a further exemplary method for reliable messaging using redundant message streams in a high speed, low latency data communications environment according to exemplary embodiments of the present invention.

The example of FIG. 5 includes two active feed adapter source streams—a first active feed adapter source stream (502) and a second active feed adapter source stream (506). Each active feed adapter source stream (502, 506) is a message stream from a feed source to the active feed adapter. The feed source transmits active source stream messages (504) to the active feed adapter on the two active feed adapter source streams (502, 506). As mentioned above, a feed source may transmit application messages to the active feed adapter using more than one message stream because the bandwidth required to transmit the messages on a single message stream is not available. In a financial market data environment, for example, a feed source may transmit ticks for financial securities that begin with the letters 'A' through 'M' on one message stream and transmit ticks for the financial securities that begin with the letters 'N' through 'Z' on another message stream. For redundancy, both message streams may be transmitted to an active feed adapter and a backup feed adapter.

In the example of FIG. 5, each feed adapter source stream (502, 506) is identified in the active feed adapter by an active source stream identifier (406). The active source stream identifier (406) represents the source stream through which the active feed adapter received a particular active source stream message (504). Each active source stream message (504) of FIG. 5 is characterized by an active source stream sequence number (408) for the feed adapter source stream on which the active source stream message was received. The active source stream sequence number (408) represents the sequence number that uniquely identifies the active source stream message among the other active source stream messages received by the active feed adapter on a particular source stream. The active source stream sequence number (408) also provides the relative transmission order for a particular active source stream message with respect to the other active source stream messages received in the active feed adapter.

Because the feed source typically assigns the same sequence numbers to the messages transmitted on each of the active feed adapter source streams (502, 506), the active feed adapter cannot unique identify the active source stream messages (504) using only active source stream sequence number (408). Consider, for example, a financial market data environment in which a feed source provides an active feed adapter ticks through two feed adapter source streams. The feed source may transmit to the active feed adapter a tick for 'IBM' on the first feed adapter source stream using a source stream sequence number of '1' and transmit a tick for 'SUNW' on the second feed adapter source stream also using a source stream sequence number of '1.' Because both ticks have a source stream sequence number of '1,' the feed adapter cannot uniquely identify a tick using only the source stream sequence number.

Combining the active source stream identifier (406) with the active source stream sequence number (408), however, does provide the feed adapter with the ability to unique identify active source stream messages (504). Continuing with the example from above, consider that the active feed adapter assigns a value of '1' to the active source stream identifier (406) for the first feed adapter source stream and a value of '2' to the active source stream identifier (406) for the second feed adapter source stream. A value of '1' for the active source stream identifier (406) and a value of '1' for the active source stream sequence number (408) uniquely identifies the tick for 'IBM' on the active feed adapter. Similarly, a value of '2' for the active source stream identifier (406) and a value of '1' for the active source stream sequence number (408) uniquely identifies the tick for 'SUNW' on the active feed adapter.

The method of FIG. 5 also includes converting (512), by the active feed adapter, each active source stream message (504) to an active application message (404). Converting (512), by the active feed adapter, each active source stream message (504) to an active application message (404) according to the method of FIG. 5 includes adding (514) to the contents of each active source stream message (504) the value of the active source stream identifier (406) for the feed adapter source stream on which the active source stream message (504) was received in the active feed adapter and an active message sequence number (410). In the method of FIG. 5, converting (512), by the active feed adapter, each active source stream message (504) to an active application message (404) may also be carried out by calling converter functions capable of converting source stream messages (504) having a first format to application messages (404) having a second format. The second format of the application messages (404) is specified using a message model (510). As mentioned above, the message model (510) represents metadata that defines the structure and the format of the active application messages (404) into which the active feed adapter converts the active source stream messages (504).

As explained above, the active application messages (404) of FIG. 5 represent application messages received by a subscribing client device from an active feed adapter. The active application messages (404) result from an active feed adapter converting active source stream messages (504) that arrive on a plurality of feed adapter source streams (502, 506) according to the message model (510). Each active application message (404) of FIG. 5 is characterized by an active source stream identifier (406), an active source stream sequence number (408), and an active message sequence number (410).

The method of FIG. 5 is described with reference to active feed adapters, active source stream messages on a plurality of feed adapter source streams, active source stream identifier, active source stream sequence number, active application messages, active message sequence numbers, and so on. Readers will note, however, that exemplary methods for reliable messaging using redundant message streams in a high speed, low latency data communications environment that include: receiving, in the backup feed adapter, backup source stream messages on a plurality of feed adapter source streams, each feed adapter source stream identified in the backup feed adapter by a backup source stream identifier, each backup source stream message characterized by a backup source stream sequence number for the feed adapter source stream on which the backup source stream message was received; and converting, by the backup feed adapter, each backup source stream message to a backup application message, including adding to the contents of each backup source stream message the value of the backup source stream identifier for the feed adapter source stream on which the backup source stream message was received in the backup feed adapter and a backup message sequence number, operate in a manner similar to the method of FIG. 5.

Often, an active feed adapter receives an administrative message from the feed source that the active feed adapter passes along to the subscribing client device. Because the subscribing client device needs to be able to obtain the administrative message from both the active feed adapter and a backup feed adapter in the same relative transmission order, the active feed adapter synchronizes delivery of the administrative message to the subscribing client device with the backup feed adapter. For further explanation, therefore, FIG. 6 sets forth a flowchart illustrating a further exemplary method for reliable messaging using redundant message streams in a high speed, low latency data communications environment according to embodiments of the present invention that includes transmitting (614), by the active feed adapter to the backup feed adapter, an administrative application message (610) and a value for an active message sequence number (612) that specifies a point in a transmission sequence when the active feed adapter will transmit the administrative application message (610) to the subscribing client device.

Figure 6:
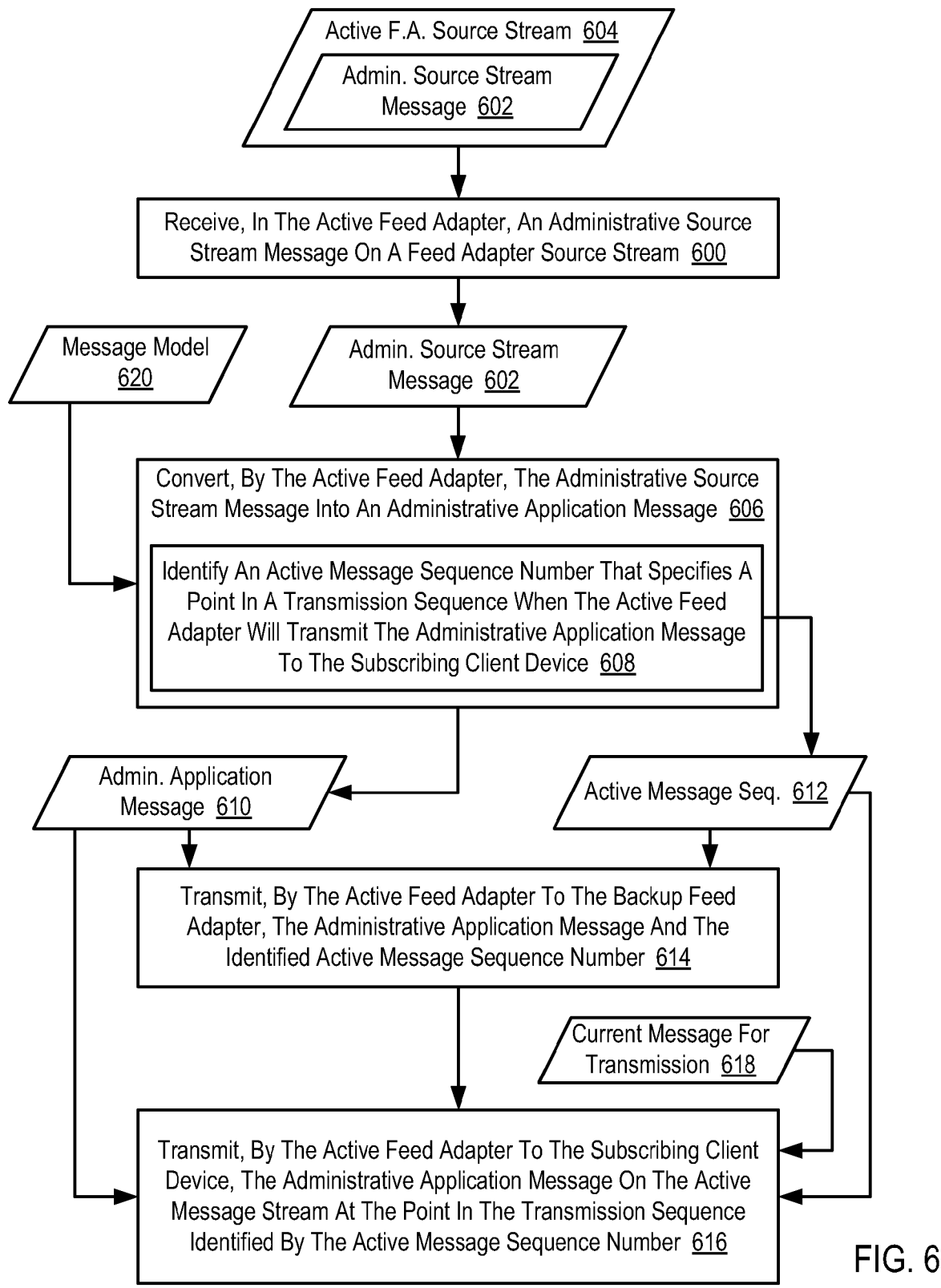
FIG. 6 sets forth a flowchart illustrating a further exemplary method for reliable messaging using redundant message streams in a high speed, low latency data communications environment according to exemplary embodiments of the present invention.

The method of FIG. 6 includes receiving (600), in the active feed adapter, an administrative source stream message (602) on a feed adapter source stream (604). The feed adapter source stream (604) represents a message stream from a feed source to the active feed adapter. The administrative source stream message (602) represents a source stream message that contains administrative information communicated from the feed source to a feed adapter. Examples of administrative information may include information stating that the feed source will shut down at 5:00 pm, that the source stream sequence numbers be reset to '1000' after 100 more messages, that a failover at the feed source has occurred, and any other administrative information as will occur to those of skill in the art.

The method of FIG. 6 also includes converting (606), by the active feed adapter, the administrative source stream message (602) into an administrative application message (610). The administrative application message (610) of FIG. 6 represents an administrative source stream message that the feed adapter converted according to a message model for transmission to a subscribing client device. Converting (606), by the active feed adapter, the administrative source stream message (602) into an administrative application message (610) according to the methods of FIG. 6 may be carried out by calling converter functions capable of converting source stream messages having a first format to application messages having a second format. The second format—the format of the administrative application message (610)—is specified using a message model (620). As mentioned above, the message model (620) represents metadata that defines the structure and the format of the administrative application messages (610) into which the active feed adapter converts the administrative source stream message (602).

In the method of FIG. 6, converting (606), by the active feed adapter, the administrative source stream message (602) into an administrative application message (610) includes identifying (608) a value for an active message sequence number (612) that specifies a point in a transmission sequence when the active feed adapter will transmit the administrative application message (610) to the subscribing client device. Identifying (608) an active message sequence number (612) according to the method of FIG. 6 may be carried out by identifying the value for the active message sequence number of the most recent application message processed by the active feed adapter and adding a predetermined number to the identified value. The predetermined number should be high enough to produce a value for the active message sequence number (612) that specifies a point far enough ahead in the transmission sequence to permit the backup feed adapter to synchronize with the active feed adapter.

The method of FIG. 6 also includes transmitting (614), by the active feed adapter to the backup feed adapter, the administrative application message (610) and the value for the identified active message sequence number (612). Transmitting (614), by the active feed adapter to the backup feed adapter, the administrative application message (610) and the value for the identified active message sequence number (612) according to the method of FIG. 6 may be carried out by transmitting the administrative application message (610) and the value for the identified active message sequence number (612) by calling member methods of CORBA objects, calling member methods of remote objects using the Java RMI API, using web services, or any other communication implementation as will occur to those of skill in the art.

The method of FIG. 6 also includes transmitting (616), by the active feed adapter to the subscribing client device, the administrative application message (610) on the active message stream at the point in the transmission sequence identified by the active message sequence number (612). Transmitting (616), by the active feed adapter to the subscribing client device, the administrative application message (610) on the active message stream at the point in the transmission sequence identified by the active message sequence number (612) may be carried out by encapsulating the administrative application message (610) into transport packets, such as, for example, TCP packets or UDP packets when a value for a current message for transmission (618) matches the value for the active message sequence number (612), and transmitting the transport packets to the subscribing client device using, for example, the TCP/IP protocols or the UDP/IP protocols. The current message for transmission (618) is a location in computer memory that specifies the current application message being processed by the active feed adapter for transmission to the subscribing client device by storing the active message sequence number of the current application message being processed by the active feed adapter for transmission.

As mentioned above, the active feed adapter transmits an administrative application message and a value for the active message sequence number to the backup feed adapter in order to synchronize transmission of the administrative application message to a subscribing client device. For further explanation, therefore, FIG. 7 sets forth a flowchart illustrating a further exemplary method for reliable messaging using redundant message streams in a high speed, low latency data communications environment according to embodiments of the present invention that includes receiving (700), in the backup feed adapter from the active feed adapter, an administrative application message (610) and a value for an active message sequence number (612) that specifies a point in a transmission sequence when the active feed adapter will transmit the administrative application message (610) to the subscribing client device. The administrative application message (610) of FIG. 7 represents an administrative source stream message that a feed adapter converted according to a message model for transmission to a subscribing client device.

Figure 7:
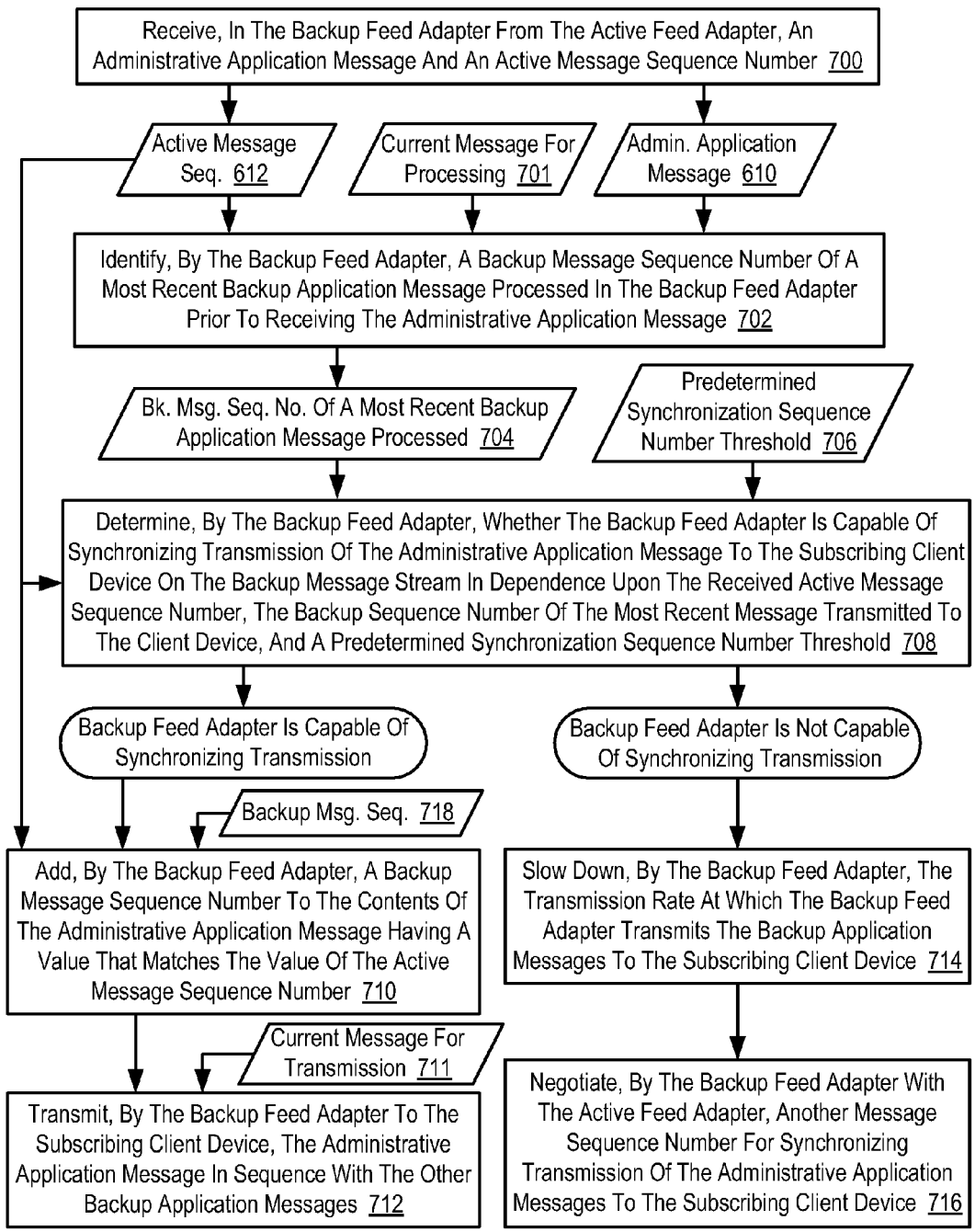
FIG. 7 sets forth a flowchart illustrating a further exemplary method for reliable messaging using redundant message streams in a high speed, low latency data communications environment according to exemplary embodiments of the present invention.

The method of FIG. 7 also includes identifying (702), by the backup feed adapter, a value for a backup message sequence number (704) of a most recent backup application message processed in the backup feed adapter prior to receiving the administrative application message (610). Identifying (702), by the backup feed adapter, a value for a backup message sequence number (704) of a most recent backup application message processed in the backup feed adapter prior to receiving the administrative application message (610) may be carried out by retrieving the value from a current message for processing (701) when the backup feed adapter receives the administrative application message (610) from the active feed adapter. The current message for processing (701) of FIG. 7 is a location in computer memory that specifies the current message being processed by the backup feed adapter by storing the value for the backup message sequence number of the current message being processed by the backup feed adapter.

The method of FIG. 7 also includes determining (708), by the backup feed adapter, whether the backup feed adapter is capable of synchronizing transmission of the administrative application message (610) to the subscribing client device on the backup message stream in dependence upon the value for the received active message sequence number (612), the value for the backup sequence number (704) of the most recent message transmitted to the client device, and a predetermined synchronization sequence number threshold (706). The predetermined synchronization sequence number threshold (706) is a value that specifies whether value for the received active message sequence number (612) is far enough ahead in the transmission sequence such that the backup feed adapter has enough time to synchronize transmission of the administrative application message (610) with the transmission of the administrative application message (610) by the active feed adapter.

In the method of FIG. 7, determining (708) whether the backup feed adapter is capable of synchronizing transmission of the administrative application message (610) to the subscribing client device on the backup message stream may be carried out by comparing the predetermined synchronization sequence number threshold (706) with the difference between the value for the received active message sequence number (612) and the value for the backup sequence number (704) of the most recent message transmitted to the client device. In such an exemplary embodiment, if the predetermined synchronization sequence number threshold (706) exceeds the difference between the value for the received active message sequence number (612) and the value for the backup sequence number (704) of the most recent message transmitted to the client device, then the backup feed adapter is capable of synchronizing transmission of the administrative application message (610) to the subscribing client device on the backup message stream. The backup feed adapter, however, is not capable of synchronizing transmission of the administrative application message (610) to the subscribing client device on the backup message stream in such an exemplary embodiment if the predetermined synchronization sequence number threshold (706) does not exceed the difference between the value for the received active message sequence number (612) and the value for the backup sequence number (704) of the most recent message transmitted to the client device.

The method of FIG. 7 includes adding (710), by the backup feed adapter, a backup message sequence number (718) to the contents of the administrative application message (610) having a value that matches the value of the active message sequence number (612), and transmitting (712), by the backup feed adapter to the subscribing client device, the administrative application message (610) in sequence with the other backup application messages when the backup feed adapter is capable of synchronizing transmission of the administrative application message to the subscribing client device on the backup message stream. In the method of FIG. 7, adding (710), by the backup feed adapter, a backup message sequence number (718) to the contents of the administrative application message (610) having a value that matches the value of the active message sequence number (612) may be carried out by storing the value of the active message sequence number (612) in a data field of the administrative application message (610) that corresponds to the backup message sequence number (718) using a message model that specifies the format of the administrative application message (610).

In the method of FIG. 7, transmitting (712), by the backup feed adapter to the subscribing client device, the administrative application message (610) in sequence with the other backup application messages may be carried out by encapsulating the administrative application message (610) into transport packets, such as, for example, TCP packets or UDP packets when a value for a current message for transmission (711) matches the value for the backup message sequence number (718) added to the message (610), and transmitting the transport packets to the subscribing client device using, for example, the TCP/IP protocols or the UDP/IP protocols. The current message for transmission (711) is a location in computer memory that specifies the current application message being processed by the active feed adapter for transmission to the subscribing client device by storing the backup message sequence number of the current application message being processed by the backup feed adapter for transmission.

The method of FIG. 7 also includes slowing down (714), by the backup feed adapter, the transmission rate at which the backup feed adapter transmits the backup application message to the subscribing client device, and negotiating (716), by the backup feed adapter with the active feed adapter, another message sequence number for synchronizing transmission of the administrative application messages to the subscribing client device when the backup feed adapter is not capable of synchronizing transmission of the administrative application message to the subscribing client device on the backup message stream. In the method of FIG. 7, slowing down (714), by the backup feed adapter, the transmission rate at which the backup feed adapter transmits the backup application messages to the subscribing client device may be carried out by repeated pausing transmission of backup application messages for a predetermined time period. The backup feed adapter may pause transmission after transmitting each backup application message, after transmitting every other backup application message, or any other frequency as will occur to those of skill in the art.

In the method of FIG. 7, negotiating (716), by the backup feed adapter with the active feed adapter, another message sequence number for synchronizing transmission of the administrative application messages to the subscribing client device may be carried out by transmitting, to the active feed adapter, a request for the active feed adapter to provide another value for the active message sequence number (612) used for synchronizing transmission of the administrative application message (610) with transmission of the administrative application message (610) by the active feed adapter. Negotiating (716), by the backup feed adapter with the active feed adapter, another message sequence number for synchronizing transmission of the administrative application messages to the subscribing client device according to the method of FIG. 7 may also be carried out by identifying a new value for the active message sequence number (612) that specifies a point in a transmission sequence when the active feed adapter will transmit the administrative application message (610) to the subscribing client device that provides time for the backup feed adapter to synchronize transmission of the administrative application message (610) with transmission of the administrative application message (610) by the active feed adapter. Negotiating (716), by the backup feed adapter with the active feed adapter, another message sequence number for synchronizing transmission of the administrative application messages to the subscribing client device according to the method of FIG. 7 may further be carried out by transmitting the new value for the active message sequence number (612) to the active feed adapter.

In view of the explanations set forth above in this document, readers will recognize that practicing reliable messaging using redundant message streams in a high speed, low latency data communications environment to embodiments of the present invention provides the following benefits:
  increased performance in data recovery after failover because subscribing client devices need not examine the entire contents of all the received active application message and the received backup application message to identify duplicate backup application messages, and
  subscribing client devices may receive administrative application messages in the same relative order with respect to other application messages regardless of whether the messages were received from the active feed adapter or from the backup feed adapter after failover.

Exemplary embodiments of the present invention are described largely in the context of a fully functional computer system for reliable messaging using redundant message streams in a high speed, low latency data communications environment. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of reliable messaging using redundant message streams in a data communications environment, the method comprising:

brokering, by a stream administration server, establishment of an active message stream to a subscribing client device from an active feed adapter, the active message stream capable of communicating active application messages, each active application message characterized by an active source stream identifier, an active source stream sequence number, and an active message sequence number;

brokering, by the stream administration server, establishment of a backup message stream to the subscribing client device from a backup feed adapter, the backup message stream capable of communicating backup application messages representing duplicates of the active application messages, each backup application message characterized by a backup source stream identifier, a backup source stream sequence number, and a backup message sequence number;

receiving the active application messages in messaging middleware of the subscribing client device from the active feed adapter;

receiving, in response to a failover from the active feed adapter to the backup feed adapter, the backup application messages in the messaging middleware of the subscribing client device from the backup feed adapter;

administering, by the messaging middleware of the subscribing client device, the backup application messages in dependence upon the active stream source identifier, the active stream source sequence number, the backup stream source identifier, and the backup stream source sequence number, wherein each feed adapter comprises a device configured to convert messages on a feed adapter source stream having a first format to messages on a feed adapter output stream having a second format and transmit the messages on the feed adapter output stream to subscribing client devices;

receiving, in the backup feed adapter from the active feed adapter, an administrative application message and an active message sequence number that specifies a point in a transmission sequence when the active feed adapter will transmit the administrative application message to the subscribing client device;

identifying, by the backup feed adapter, a backup message sequence number of a most recent backup application message processed in the backup feed adapter prior to receiving the administrative application message; and determining, by the backup feed adapter, whether the backup feed adapter is capable of synchronizing transmission of the administrative application message to the subscribing client device on the backup message stream in dependence upon the received active message sequence number, the backup sequence number of the most recent message transmitted to the client device, and a predetermined synchronization sequence number threshold.

2. The method of claim 1 wherein at least some of the backup application messages represent duplicates of active application messages previously received in the messaging middleware of the subscribing client device.

3. The method of claim 1 wherein the data communications environment comprises a data communications network, the network further comprising the active feed adapter, the backup feed adapter, the stream administration server, at least one subscribing client device, and no router.

4. The method of claim 1 further comprising:

receiving, in the active feed adapter, active source stream messages on a plurality of feed adapter source streams, each feed adapter source stream identified in the active feed adapter by an active source stream identifier, each active source stream message characterized by an active source stream sequence number for the feed adapter source stream on which the active source stream message was received; and converting, by the active feed adapter, each active source stream message to an active application message, including adding to the contents of each active source stream message the active source stream identifier for the feed adapter source stream on which the active source stream message was received in the active feed adapter and an active message sequence number.

5. The method of claim 1 further comprising:

receiving, in the backup feed adapter, backup source stream messages on a plurality of feed adapter source streams, each feed adapter source stream identified in the backup feed adapter by a backup source stream identifier, each backup source stream message characterized by a backup source stream sequence number for the feed adapter source stream on which the backup source stream message was received; and converting, by the backup feed adapter, each backup source stream message to a backup application message, including adding to the contents of each backup source stream message the backup source stream identifier for the feed adapter source stream on which the backup source stream message was received in the backup feed adapter and a backup message sequence number.

6. The method of claim 1 wherein the backup feed adapter is capable of synchronizing transmission of the administrative application message to the subscribing client device on the backup message stream, and the method further comprises:

adding, by the backup feed adapter, a backup message sequence number to the contents of the administrative application message having a value that matches the value of the active message sequence number; and transmitting, by the backup feed adapter to the subscribing client device, the administrative application message in sequence with the other backup application messages.

7. The method of claim 1 wherein the backup feed adapter is not capable of synchronizing transmission of the administrative application message to the subscribing client device on the backup message stream, and the method further comprises:
slowing down, by the backup feed adapter, the transmission rate at which the backup feed adapter transmits the backup application messages to the subscribing client device; and
negotiating, by the backup feed adapter with the active feed adapter, another message sequence number for synchronizing transmission of the administrative application messages to the subscribing client device.

8. Apparatus for reliable messaging using redundant message streams in a data communications environment:
a system administration server configured to,
broker establishment of an active message stream to a subscribing client device from an active feed adapter, the active message stream capable of communicating active application messages, each active application message characterized by an active source stream identifier, an active source stream sequence number, and an active message sequence number;
broker establishment of a backup message stream to the subscribing client device from a backup feed adapter, the backup message stream capable of communicating backup application messages representing duplicates of the active application messages, each backup application message characterized by a backup source stream identifier, a backup source stream sequence number, and a backup message sequence number;
receive the active application messages in messaging middleware of the subscribing client device from the active feed adapter;
receive, in response to a failover from the active feed adapter to the backup feed adapter, the backup application messages in the messaging middleware of the subscribing client device from the backup feed adapter;
subscribing client device configured to administer, by the messaging middleware, the backup application messages in dependence upon the active stream source identifier, the active stream source sequence number, the backup stream source identifier, and the backup stream source sequence number, wherein each feed adapter comprises a device configured to convert messages on a feed adapter source stream having a first format to messages on a feed adapter output stream having a second format and transmit the messages on the feed adapter output stream to subscribing client devices;
the backup feed adapter configured to,
receive, from the active feed adapter, an administrative application message and an active message sequence number that specifies a point in a transmission sequence when the active feed adapter will transmit the administrative application message to the subscribing client device;
identify a backup message sequence number of a most recent backup application message processed in the backup feed adapter prior to receiving the administrative application message; and
determine whether the backup feed adapter is capable of synchronizing transmission of the administrative application message to the subscribing client device on the backup message stream in dependence upon the received active message sequence number, the backup sequence number of the most recent message transmitted to the client device, and a predetermined synchronization sequence number threshold.

9. The apparatus of claim 8 further comprising:
the active feed adapter configured to,
receive, in the active feed adapter, active source stream messages on a plurality of feed adapter source streams, each feed adapter source stream identified in the active feed adapter by an active source stream identifier, each active source stream message characterized by an active source stream sequence number for the feed adapter source stream on which the active source stream message was received; and
convert, by the active feed adapter, each active source stream message to an active application message, including adding to the contents of each active source stream message the active source stream identifier for the feed adapter source stream on which the active source stream message was received in the active feed adapter and an active message sequence number.

10. A computer program product for reliable messaging using redundant message streams in a data communications environment, the computer program product disposed upon a non-transitory computer readable recordable medium, the computer program product comprising computer program instructions configured to:
broker, by a stream administration server, establishment of an active message stream to a subscribing client device from an active feed adapter, the active message stream capable of communicating active application messages, each active application message characterized by an active source stream identifier, an active source stream sequence number, and an active message sequence number;
broker, by the stream administration server, establishment of a backup message stream to the subscribing client device from a backup feed adapter, the backup message stream capable of communicating backup application messages representing duplicates of the active application messages, each backup application message characterized by a backup source stream identifier, a backup source stream sequence number, and a backup message sequence number;
receive the active application messages in messaging middleware of the subscribing client device from the active feed adapter;
receive, in response to a failover from the active feed adapter to the backup feed adapter, the backup application messages in the messaging middleware of the subscribing client device from the backup feed adapter;
administer, by the messaging middleware of the subscribing client device, the backup application messages in dependence upon the active stream source identifier, the active stream source sequence number, the backup stream source identifier, and the backup stream source sequence number, wherein each feed adapter comprises a device configured to convert messages on a feed adapter source stream having a first format to messages on a feed adapter output stream having a second format and transmit the messages on the feed adapter output stream to subscribing client devices;
receive, in the backup feed adapter from the active feed adapter, an administrative application message and an active message sequence number that specifies a point in a transmission sequence when the active feed adapter will transmit the administrative application message to the subscribing client device;

identify, by the backup feed adapter, a backup message sequence number of a most recent backup application message processed in the backup feed adapter prior to receiving the administrative application message; and determine, by the backup feed adapter, whether the backup feed adapter is capable of synchronizing transmission of the administrative application message to the subscribing client device on the backup message stream in dependence upon the received active message sequence number, the backup sequence number of the most recent message transmitted to the client device, and a predetermined synchronization sequence number threshold.

11. The computer program product of claim 10 further comprising computer program instructions configured to:

receive, in the active feed adapter, active source stream messages on a plurality of feed adapter source streams, each feed adapter source stream identified in the active feed adapter by an active source stream identifier, each active source stream message characterized by an active source stream sequence number for the feed adapter source stream on which the active source stream message was received; and convert, by the active feed adapter, each active source stream message to an active application message, including adding to the contents of each active source stream message the active source stream identifier for the feed adapter source stream on which the active source stream message was received in the active feed adapter and an active message sequence number.

12. The method of claim 1 further comprising:

receiving, in the active feed adapter, an administrative source stream message on a feed adapter source stream;

converting, by the active feed adapter, the administrative source stream message into an administrative application message, including identifying an active message sequence number that specifies a point in a transmission sequence when the active feed adapter will transmit the administrative application message to the subscribing client device;

transmitting, by the active feed adapter to the backup feed adapter, the administrative application message and the identified active message sequence number; and transmitting, by the active feed adapter to the subscribing client device, the administrative application message on the active message stream at the point in the transmission sequence identified by the active message sequence number.

13. The apparatus of claim 8, wherein the active feed adapter is further configured to:

receive, in the active feed adapter, an administrative source stream message on a feed adapter source stream;

convert, by the active feed adapter, the administrative source stream message into an administrative application message, including identifying an active message sequence number that specifies a point in a transmission sequence when the active feed adapter will transmit the administrative application message to the subscribing client device;

transmit, by the active feed adapter to the backup feed adapter, the administrative application message and the identified active message sequence number; and transmit, by the active feed adapter to the subscribing client device, the administrative application message on the active message stream at the point in the transmission sequence identified by the active message sequence number.

14. The computer program product of claim 10 further comprising computer program instructions configured to:

receive, in the active feed adapter, an administrative source stream message on a feed adapter source stream;

convert, by the active feed adapter, the administrative source stream message into an administrative application message, including identifying an active message sequence number that specifies a point in a transmission sequence when the active feed adapter will transmit the administrative application message to the subscribing client device;

transmit, by the active feed adapter to the backup feed adapter, the administrative application message and the identified active message sequence number; and transmit, by the active feed adapter to the subscribing client device, the administrative application message on the active message stream at the point in the transmission sequence identified by the active message sequence number.

* * * * *